(12) United States Patent
Nakano et al.

(10) Patent No.: US 8,648,513 B2
(45) Date of Patent: Feb. 11, 2014

(54) PERMANENT MAGNET TYPE ROTATING ELECTRICAL MACHINE AND ELECTRIC POWER STEERING DEVICE

(75) Inventors: Masatsugu Nakano, Chiyoda-ku (JP);
Kazuhisa Takashima, Chiyoda-ku (JP);
Satoru Akutsu, Chiyoda-ku (JP);
Yoshihito Asao, Chiyoda-ku (JP)

(73) Assignee: Mitsubishi Electronics Corporation, Tokyo (JP)

( * ) Notice: Subject to any disclaimer, the term of this patent is extended or adjusted under 35 U.S.C. 154(b) by 266 days.

(21) Appl. No.: 12/741,773

(22) PCT Filed: Sep. 26, 2008

(86) PCT No.: PCT/JP2008/067470
§ 371 (c)(1),
(2), (4) Date: May 6, 2010

(87) PCT Pub. No.: WO2009/063696
PCT Pub. Date: May 22, 2009

(65) Prior Publication Data
US 2010/0244605 A1   Sep. 30, 2010

(30) Foreign Application Priority Data
Nov. 15, 2007   (JP) .................................. 2007-296477

(51) Int. Cl.
*H02K 1/27*   (2006.01)
(52) U.S. Cl.
CPC ..................... *H02K 1/278* (2013.01)
USPC ............ 310/156.38; 310/156.01; 310/156.02; 310/156.08; 310/156.12; 310/156.19; 310/156.42
(58) Field of Classification Search
CPC ..................................................... H02K 1/278
USPC ............. 310/156.01, 156.02, 156.08, 156.12, 310/156.19, 156.38, 156.42
IPC ......................................................... H02K 1/27
See application file for complete search history.

(56) References Cited

U.S. PATENT DOCUMENTS

| | | | |
|---|---|---|---|
| 5,397,951 A * | 3/1995 | Uchida et al. | 310/156.21 |
| 5,760,520 A * | 6/1998 | Hasebe et al. | 310/156.19 |
| 6,335,582 B1 * | 1/2002 | Abukawa et al. | 310/214 |

(Continued)

FOREIGN PATENT DOCUMENTS

| | | |
|---|---|---|
| JP | H04-069027 | 3/1992 |
| JP | 5-304737 A | 11/1993 |

(Continued)

OTHER PUBLICATIONS

Japanese Office Action dated May 11, 2012 in corresponding Application No. JP 2009-541071.

*Primary Examiner* — John K Kim
(74) *Attorney, Agent, or Firm* — Sughrue Mion, PLLC

(57) ABSTRACT

A permanent magnet type rotating electric machine includes: a rotor including a rotor core having a polygonal shape and a plurality of permanent magnets; and a stator including a stator core and armature windings, in which, when the number of poles is M, the number of slots is N, M permanent magnets are sequentially numbered from first to M-th in a circumferential direction, and a positional shift amount in the circumferential direction from a corresponding one of equiangularly arranged reference positions, each being at the same radial distance from a center of a rotating shaft, for an i-th (i=1, 2, . . . , M) permanent magnet is $h_i$, M unit vectors in total, each being in an angular direction of $2\pi N(i-1)/M$ (rad), are defined, and a sum of M vectors obtained by multiplying the unit vectors respectively by the positional shift amount $h_i$ is smaller than a maximum value of an absolute value of the positional shift amount $h_i$.

9 Claims, 28 Drawing Sheets

(56) References Cited

U.S. PATENT DOCUMENTS

| | | | |
|---|---|---|---|
| 6,770,989 B2 * | 8/2004 | Miyagawa et al. | 310/12.26 |
| 6,788,013 B2 * | 9/2004 | Islam et al. | 318/432 |
| 7,116,026 B2 * | 10/2006 | Kuwabara et al. | 310/156.21 |
| 2002/0112904 A1 | 8/2002 | Matsunobu et al. | |
| 2003/0111914 A1 * | 6/2003 | Miyagawa et al. | 310/12 |
| 2003/0201681 A1 * | 10/2003 | Shimizu et al. | 310/51 |
| 2004/0217664 A1 * | 11/2004 | Kuwabara et al. | 310/156.21 |
| 2005/0269895 A1 | 12/2005 | Innami et al. | |
| 2006/0038457 A1 * | 2/2006 | Miyata | 310/156.45 |
| 2007/0188036 A1 * | 8/2007 | Shibukawa | 310/113 |
| 2007/0296297 A1 * | 12/2007 | Jones et al. | 310/156.28 |
| 2010/0244605 A1 * | 9/2010 | Nakano et al. | 310/156.01 |

FOREIGN PATENT DOCUMENTS

| | | |
|---|---|---|
| JP | 2001-251703 A | 9/2001 |
| JP | 2003-061280 A | 2/2003 |
| JP | 2003-092846 A | 3/2003 |
| JP | 2003-324867 A | 11/2003 |
| JP | 2006-514522 A | 8/2004 |
| JP | 2005-348522 A | 12/2005 |
| JP | 2006-060920 A | 3/2006 |
| JP | 2006-187189 A | 7/2006 |
| JP | 2006-353063 A | 12/2006 |
| JP | 2007-228800 A | 9/2007 |
| JP | 2007-267575 A | 10/2007 |

* cited by examiner

END OF PROJECTION

ANGLE OF ROTATION(deg.)

ORDER

PERMANENT MAGNET TYPE ROTATING ELECTRICAL MACHINE AND ELECTRIC POWER STEERING DEVICE

TECHNICAL FIELD

The present invention relates to a permanent magnet type rotating electric machine such as a motor for an electric power steering device for a vehicle and an industrial servomotor and to the electric power steering device.

BACKGROUND ART

In recent years, a motor having a small cogging torque has been demanded for various applications, which include, for example, an industrial servomotor and a hoisting machine for an elevator. Paying attention to the applications to vehicles, electric power steering devices have become widely used to improve fuel efficiency and steering ease. A cogging torque of a motor used for the electric power steering device is transmitted to a driver through an intermediation of a gear. Therefore, in order to obtain smooth steering feel, there is a strong request for a reduction in the cogging torque of the motor. In response to this request, a method of moving permanent magnets to adjust the cogging torque by using linear programming (for example, see Patent Document 1) and a method of reducing a 6×p-th order harmonic wave (p is the number of pole pairs) of the cogging torque in the case where a ratio of the number of slots and the number of poles is 3:2 (for example, see Patent Document 2) have been disclosed as techniques of reducing the cogging torque.

Patent Document 1: JP 2006-60920 A
Patent Document 2: JP 2006-514522 A

DISCLOSURE OF THE INVENTION

Problem to be Solved by the Invention

With the conventional "method of moving the permanent magnets to adjust the cogging torque by using linear programming" as described above, much efforts and long time are required to move the positions of the permanent magnets to adjust the cogging torque. Therefore, the method has a problem of being unsuitable for mass-produced motors.

Moreover, because positional shifts and shape deviations (for example, in symmetry) of the permanent magnets are factors causing an increase in the cogging torque, the cogging torque sometimes becomes extremely large if the positional shifts and the shape deviations of the permanent magnets are not controlled at all.

For example, the cogging torque in a permanent magnet type motor having ten poles and twelve slots is described referring to FIGS. 27 and 28. FIG. 27 is a view illustrating a configuration of a rotor of a conventional permanent magnet type motor. FIG. 28 are graphs respectively showing a cogging torque waveform of the conventional permanent magnet type motor and the result of analysis of a frequency.

FIG. 27 illustrates a rotor 10. Ten permanent magnets 15 are arranged on a periphery of a rotor core 11. Further, the position of each of the permanent magnets 15 is randomly shifted in a circumferential direction, while the shape (symmetry) thereof also deviates randomly.

When the positions of the permanent magnets 15 are shifted and the shapes thereof deviate with a pattern as illustrated in FIG. 27, the cogging torque has a waveform as shown in FIG. 28($a$), and therefore, the extremely large cogging torque is generated. Further, the frequency analysis of the waveform provides the result as shown in FIG. 28($b$). In terms of order, a component having a period of 360 degrees (in mechanical angle) of an angle of rotation of the rotor 10 is a first-order component. A twelfth-order component corresponding to a component whose order is equal to the number of the slots of the stator is prominent, and is due to variations on the rotor 10 side.

Moreover, the conventional "method of reducing the 6×p-th order harmonic wave (p is the number of pole pairs) of the cogging torque when the ratio of the number of slots to the number of poles is 3:2" as described above is a technique of reducing an order component whose order is equal to a least common multiple of the number of poles and the number of slots. However, a method of reducing "the order component of the cogging torque, with the order equal to the number of slots", which is generated due to the variations on the rotor side has not been disclosed.

The present invention has been made to solve the problems described above, and has an object of providing a permanent magnet type rotating electric machine and an electric power steering device, which are capable of reducing a cogging torque component generated due to a variation on a rotor side.

Means for Solving the Problems

A permanent magnet type rotating electric machine according to the present invention includes: a rotor including a rotor core having a polygonal shape and a plurality of permanent magnets; and a stator including a stator core and armature windings, in which, when a number of poles is M (M is an integer), a number of slots is N (N is an integer), M permanent magnets are sequentially numbered from first to M-th in a circumferential direction, and a positional shift amount in the circumferential direction from a corresponding one of equiangularly arranged reference positions, each being at the same radial distance from a center of a rotating shaft, for an i-th (i=1, 2, ..., M) permanent magnet is $h_i$ (i=1, 2, ..., M) (including a sign), M unit vectors in total, each being in an angular direction of $2\pi N(i-1)/M$ (rad), are defined, and a sum of M vectors obtained by multiplying the unit vectors respectively by the positional shift amount $h_i$ is smaller than a maximum value of an absolute value of the positional shift amount $h_i$.

Effects of the Invention

The permanent magnet type rotating electric machine according to the present invention provides the effects of reducing an order component whose order is equal to the number of slots of the stator among order components of a cogging torque. Further, the permanent magnet type rotating electric machine has the effects of providing so good productivity as to be suitable for mass production.

BEST MODE FOR CARRYING OUT THE INVENTION

First to seventh embodiments of the present invention are described below.

First Embodiment

Figure 1:
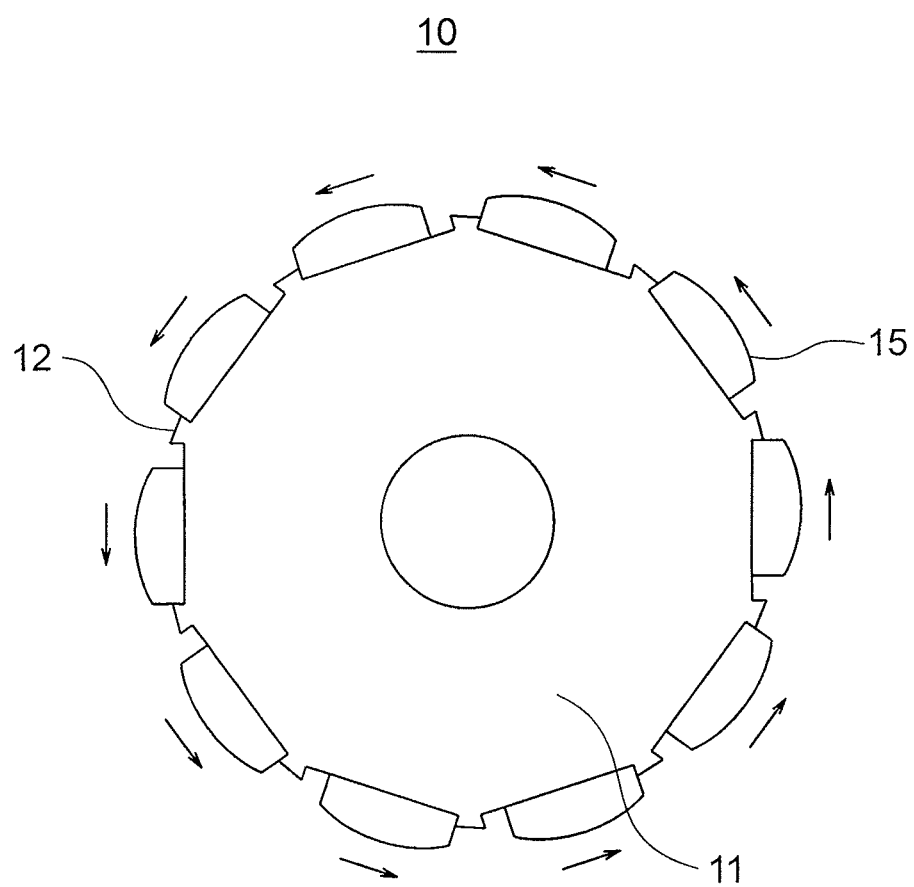
FIG. 1 is a view illustrating a first configuration of a rotor of a permanent magnet type rotating electric machine according to a first embodiment of the present invention.

A permanent magnet type rotating electric machine according to a first embodiment of the present invention is described referring to FIGS. 1 to 9, 23, and 24. FIG. 1 is a view illustrating a first configuration of a rotor of the permanent magnet type rotating electric machine according to the first embodiment of the present invention. In each of the drawings, the same reference symbols denote the same or equivalent parts.

In FIG. 1, a rotor 10 of the permanent magnet type rotating electric machine according to the first embodiment of the present invention includes a rotor core 11, a plurality of projecting portions 12, and a plurality of permanent magnets 15 arranged on a periphery of the rotor core 11 having a polygonal shape. Arrows indicate a direction in which the positions of the permanent magnets 15 shift.

Next, an operation of the permanent magnet type rotating electric machine according to the first embodiment is described referring to the drawings.

Figure 27:
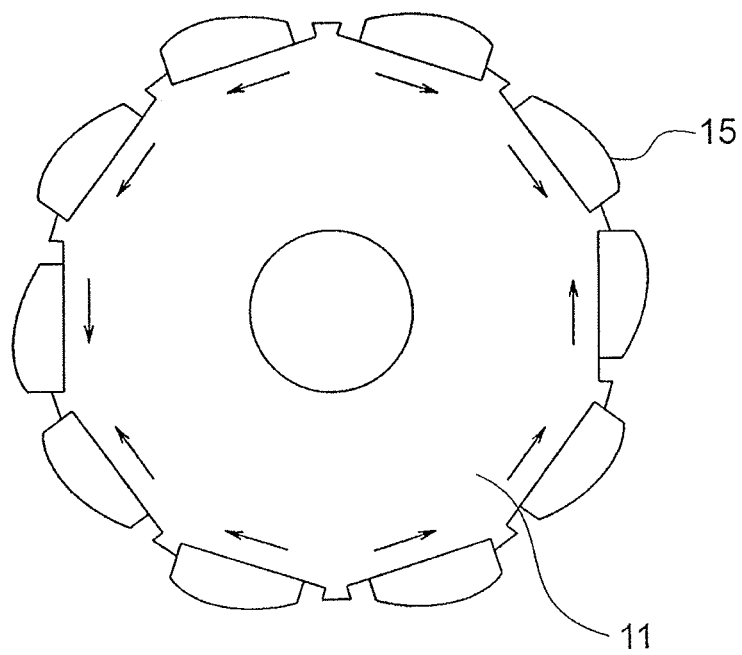
FIG. 27 is a view illustrating a configuration of a rotor of a conventional permanent magnet type motor.

As already described above, when variations in position or shape between the permanent magnets are not controlled, a cogging torque becomes large in some cases. For example, the pattern illustrated in FIG. 27 is conceived. FIG. 27 illustrates the rotor 10 of the conventional permanent magnet type motor. The permanent magnets 15 are arranged on the periphery of the rotor core 11. Arrows indicate a direction in which the positions of the permanent magnets 15 shift from reference positions thereof and a direction in which the shapes of the permanent magnets 15 deviate.

Figure 28A:
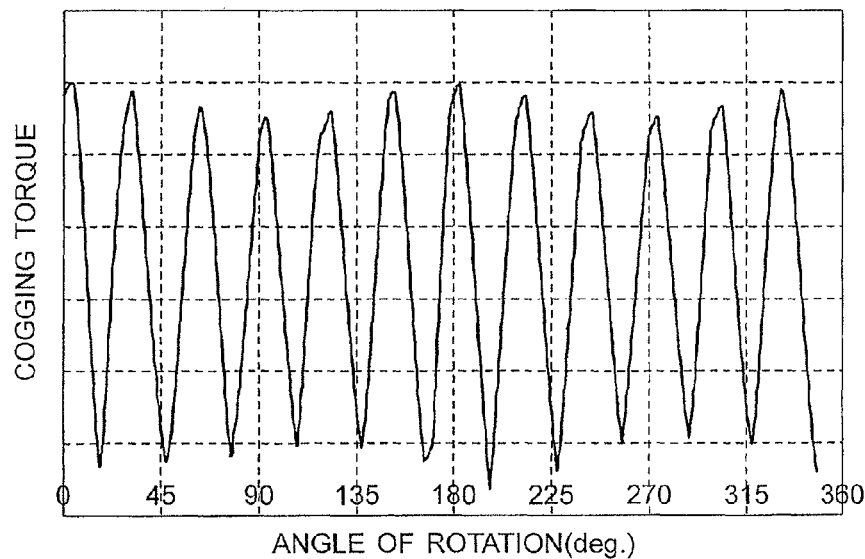
FIG. 28 are graphs respectively showing a cogging torque waveform of the conventional permanent magnet type motor and the result of analysis of a frequency.
Figure 28B:
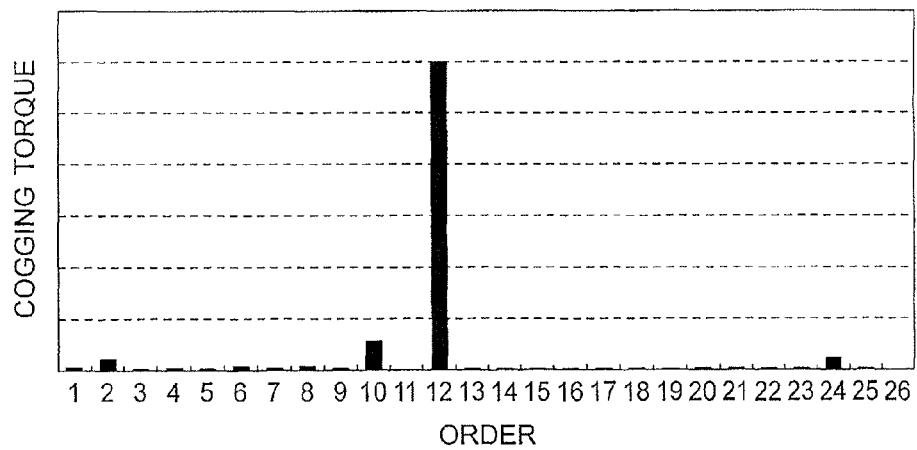

With the pattern as described above, an extremely large cogging torque as shown in FIG. 28(a) is generated. The motor has twelve slots as an example. A twelfth-order component of the cogging torque becomes extremely large as shown in FIG. 28(b). Therefore, it is important to control the variations in position or shape between the permanent magnets 15.

Accordingly, a relation between the variations in position or shape between the permanent magnets and the cogging torque is first described. Thereafter, a method of reducing the cogging torque is described.

Figure 2:
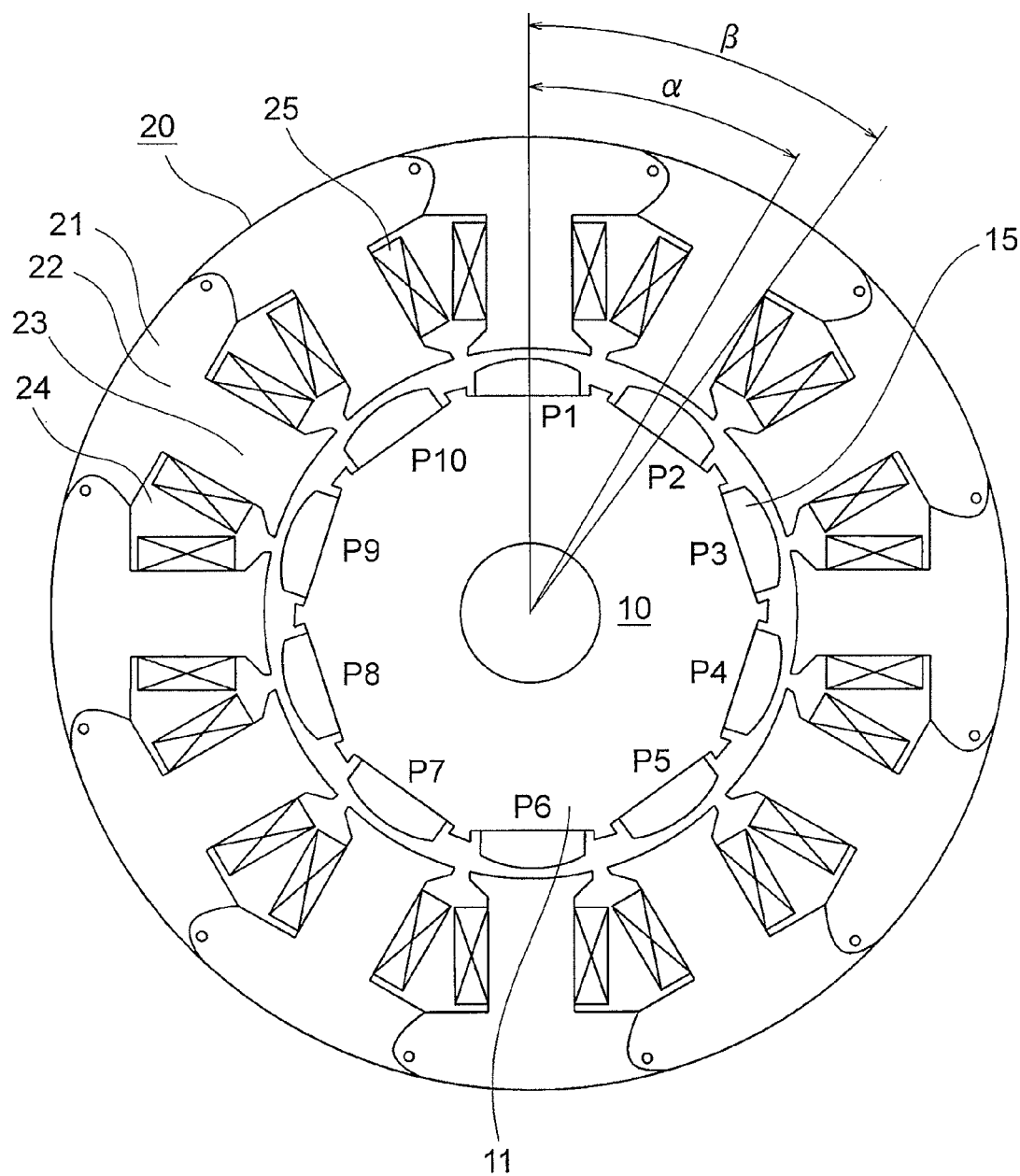
FIG. 2 is a sectional view illustrating a configuration of a general permanent magnet type motor.

FIG. 2 is a sectional view illustrating a configuration of a general permanent magnet type motor. In FIG. 2, the permanent magnet type motor includes the rotor 10 and a stator 20. The rotor 10 includes the rotor core 11 and the permanent magnets 15 (P1 to P10). The stator 20 includes a stator core 21, slots 24, and armature windings 25. The stator core 21 includes core backs 22 and teeth 23 to form a magnetic path through which a magnetic flux generated by the permanent magnets 15 and the armature windings 25 passes. In the case of FIG. 2 described above, the armature windings 25 are respectively located in the slots 24 which house the windings therein, and each of the armature windings has a so-called concentrated winding structure in which the winding is wound around each of the teeth 23 in a concentrated manner.

However, the application of the present invention is not limited to the concentrated winding, and the same effects can be obtained with a distributed winding. A frame provided on an outer periphery of the stator core 21 is omitted in FIG. 2.

The rotor 10 includes the rotor core 11 and the permanent magnets 15, as described above. The permanent magnets 15 are approximately equiangularly arranged on an outer periphery of the rotor core 11. All the permanent magnets 15 are located at approximately the same radial distance.

Let the number of magnetic poles of the motor be M and the number of slots be N. Then, in the example illustrated in FIG. 2, M=10 and N=12. In FIG. 2, equiangularly arranged positions (at intervals of $2\pi/M$ (rad)), each being a position of a center of each side of the polygon, are set as the respective reference positions of the permanent magnets P1 to P10. How the degree of the cogging torque changes when each of the permanent magnets 15 shifts from the reference position thereof is described.

A torque applied to each of the permanent magnets 15 is affected by the slots 24 of the stator core 21. The torque applied when one of the permanent magnets 15 is opposed to one of the slots 24 differs from the torque applied when the one of the permanent magnets 15 is opposed to one of the teeth 23. Therefore, a ripple component of an order which is equal to the number of slots is contained as a ripple component of the torque applied to each of the permanent magnets 15 when the rotor 10 makes one revolution. Further, each of the intervals at which the permanent magnets 15 are arranged in the circumferential direction is $\beta=2\pi/M$ (rad) in mechanical angle, as illustrated in FIG. 2. Therefore, the torques applied to the permanent magnets 15 have waveforms whose phases are shifted by $2\pi/M$ (rad) in mechanical angle from each other. When the permanent magnets 15 are all located at the reference positions, the torques are summed to cancel each other. As a result, the order component whose order is equal to the number of slots does not appear in the cogging torque waveform, resulting in a low cogging torque. However, if the permanent magnets 15 shift from the reference positions, the torques do not cancel each other, resulting in appearance of the order component whose order is equal to the number of slots.

Figure 3:
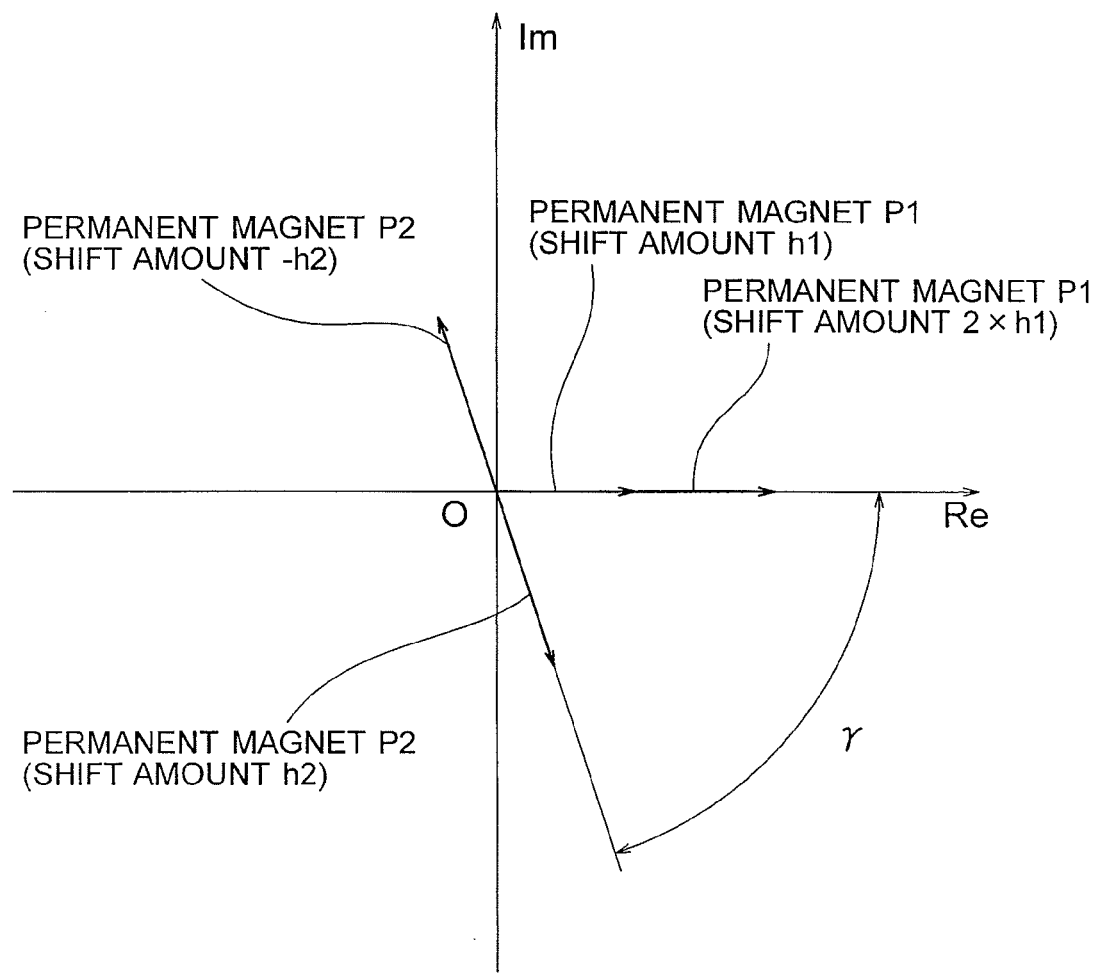
FIG. 3 is a graph for describing complex vectors.

In which phase and at which amplitude the order component of the cogging torque, which has the order equal to the number of slots, is generated when a positional shift occurs in the circumferential direction are considered using a complex vector. FIG. 3 is a graph for describing the complex vector. When a shift of a shift amount h1 occurs for the permanent magnet P1, it is assumed that the order component whose order is equal to the number of slots is a complex vector located in a real-axis (Re) direction shown in FIG. 3. A length of the vector is in proportion to the shift amount. Therefore, when, for example, the shift of a double shift amount, i.e., 2×h1, occurs, the vector has a double length, as shown in FIG. 3.

Next, the phase is considered. The permanent magnets P1 and P2 are shifted from each other by $\beta=2\pi/M$ (rad) in mechanical angle. A cycle of the order component of the cogging torque, whose order is equal to the number N of slots, is $\alpha=2\pi/N$ (rad). Therefore, if the complex vectors are defined to make 360 degrees at intervals of $2\pi/N$ (rad), a phase difference $\gamma$ between the torques applied to the permanent magnets P1 and P2 satisfies $\gamma=2\pi N/M$ (rad).

In the example of the motor having ten poles and twelve slots, the phase difference is $\gamma=2\pi 12/10$ (rad)=432 (degrees), which is equivalent to 432−360=72 degrees. Therefore, the positional relation as shown in FIG. 3 is obtained. Further, when a sign of the positional shift amount is reversed, that is, when the direction of the shift becomes opposite, the phase of the order component of the cogging torque having the order equal to the number of slots is also inverted. Therefore, a direction of the complex vector is also reversed, as shown in FIG. 3.

Summarizing the above description, the complex vector given above is as follows.

(1) The complex vector is in proportion to the positional shift amount.

(2) The phase difference between the permanent magnets is $2\pi N/M$ (rad).

(3) When the direction of the shift becomes opposite, the phase is inverted.

In consideration of the aforementioned three characteristics, a method of reducing the cogging torque is considered. When there is no positional shift at all for all the permanent magnets, all the complex vectors become a zero vector. Therefore, it is apparent that the cogging torque of the order component whose order is equal to the number of slots is not generated.

On the other hand, when there is the positional shift, the sum of the complex vectors does not generally become zero and the cogging torque of the order component whose order is equal to the number of slots is generated, resulting in an increase in the cogging torque. Depending on the positional shift pattern, however, the cogging torque of the order component whose order is equal to the number of slots is hardly generated or is not generated at all when the sum of the complex vectors is extremely small or becomes the zero vector.

Figure 4:
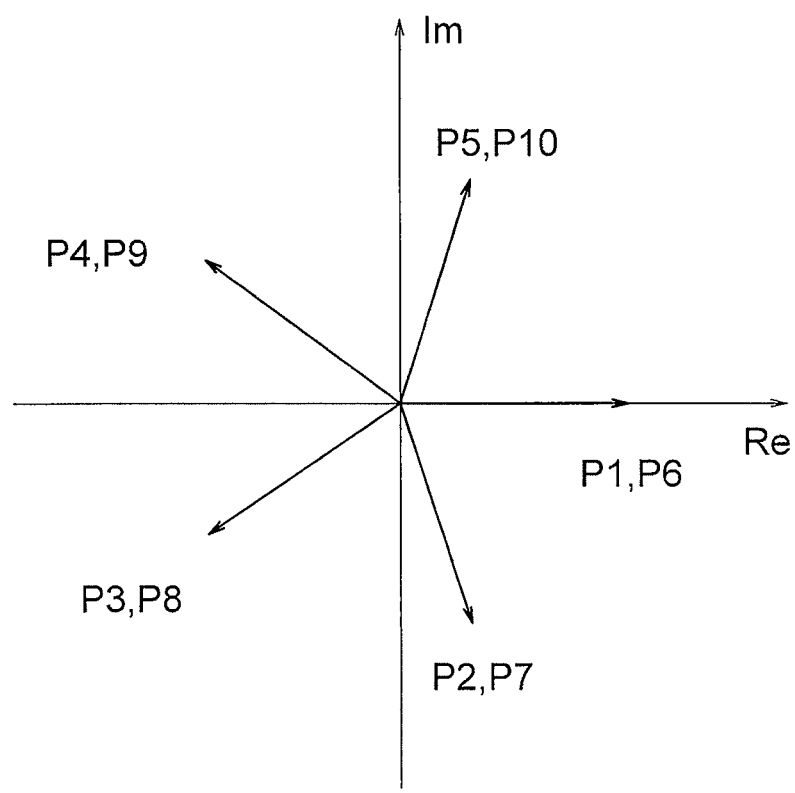
FIG. 4 is a graph showing complex vectors when all the permanent magnets shift in the same direction.

For example, the case as illustrated in FIG. 1 is conceived. As described above, FIG. 1 is the view illustrating the first configuration of the rotor of the permanent magnet type rotating electric machine according to the first embodiment. FIG. 4 is a graph showing the complex vectors when all the permanent magnets shift in the same direction. When the positional shifts of all the permanent magnets 15 are made in the same counterclockwise direction as illustrated in FIG. 1, the complex vectors are as illustrated in FIG. 4. FIG. 4 shows that the directions of the complex vectors of the permanent magnets P1 and P6 are the same. In addition, the directions of the complex vectors are the same for each set of "the permanent magnets P2 and P7", "the permanent magnets P3 and P8", "the permanent magnets P4 and P9", and "the permanent magnets P5 and P10". The total number of complex vectors is ten, each of which is shifted by 72 degrees. The sum of the ten complex vectors becomes the zero vector. Therefore, the order component whose order is equal to the number of slots is not generated.

Figure 5:
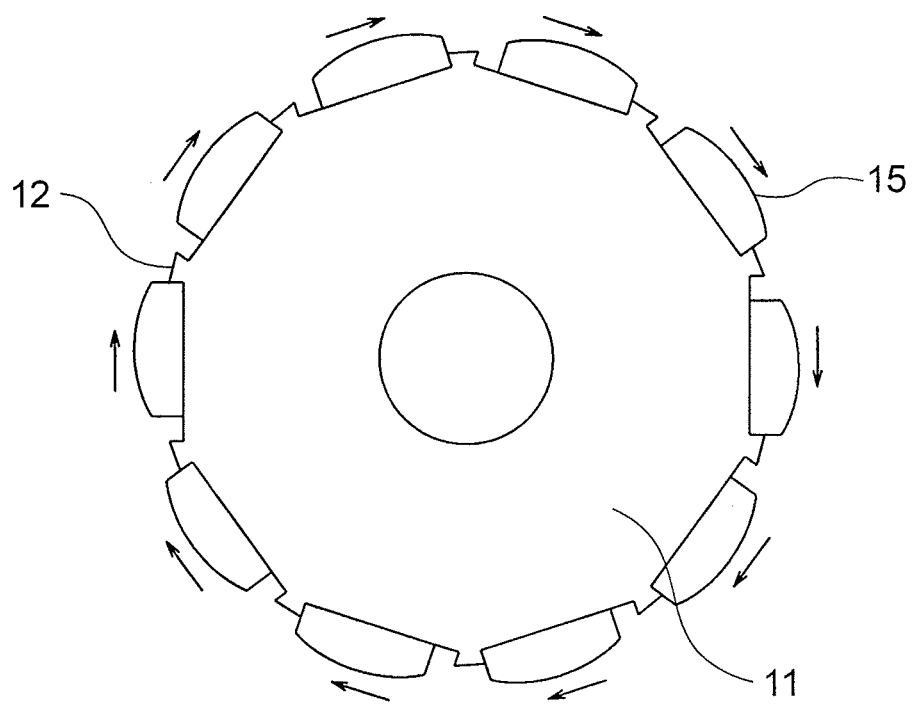
FIG. 5 is a view illustrating a second configuration of the rotor of the permanent magnet type rotating electric machine according to the first embodiment of the present invention.

FIG. 5 is a view illustrating a second configuration of the rotor of the permanent magnet type rotating electric machine according to a first embodiment of the present invention. The same effects are obtained even when the positions of all the permanent magnets 15 shift in a clockwise direction which is opposite to the direction of FIG. 1, as illustrated in FIG. 5.

Figure 6:
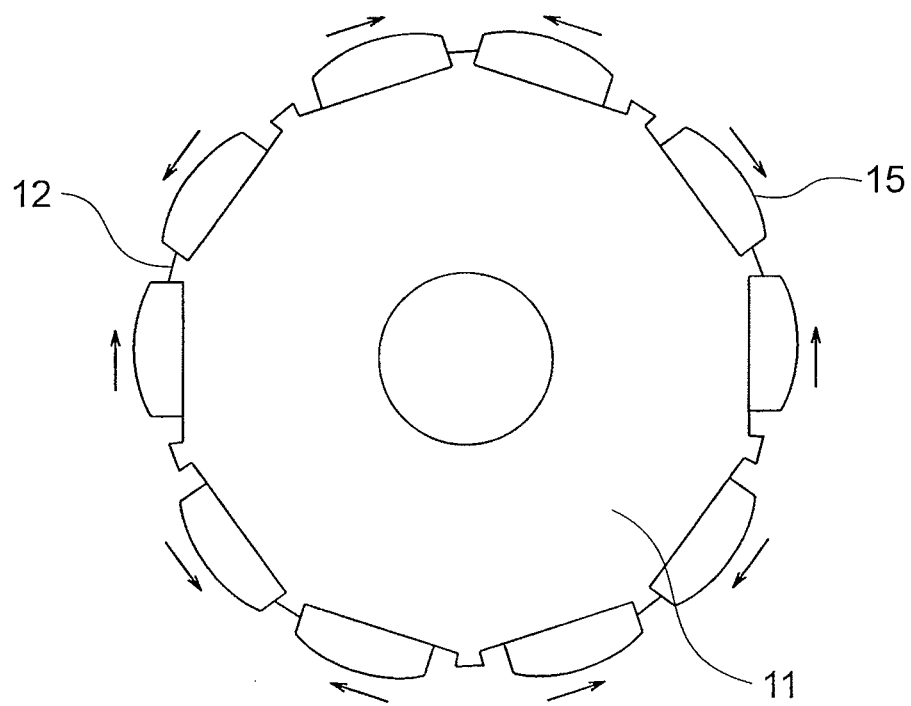
FIG. 6 is a view illustrating a third configuration of the rotor of the permanent magnet type rotating electric machine according to the first embodiment of the present invention.
Figure 7:
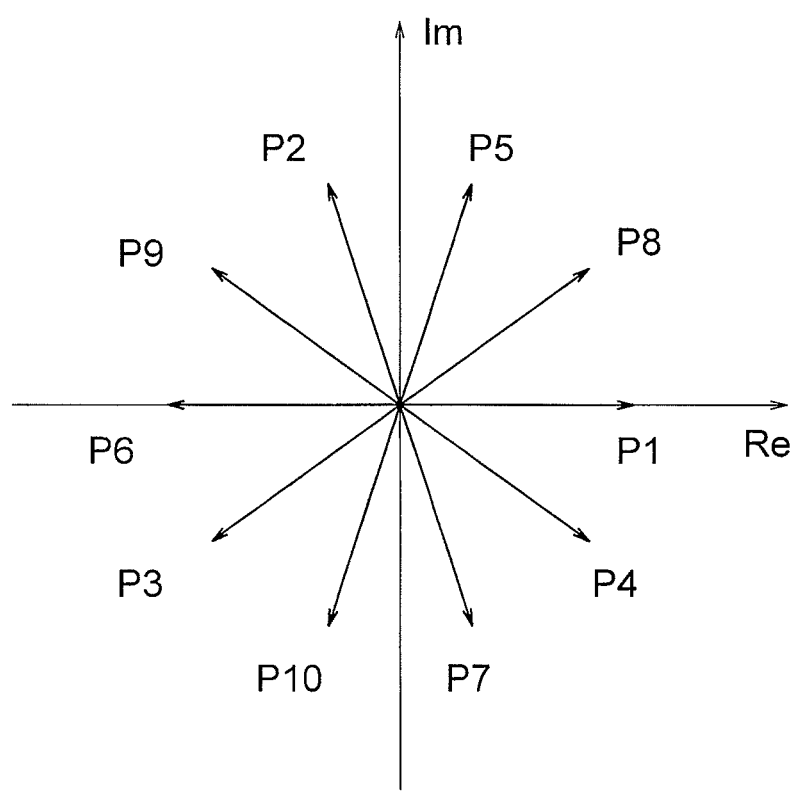
FIG. 7 is a graph showing complex vectors when the neighboring permanent magnets shift in the opposite directions to each other.

FIG. 6 is a view illustrating a third configuration of the rotor of the permanent magnet type rotating electric machine according to the first embodiment of the present invention. FIG. 7 is a graph showing the complex vectors when the neighboring permanent magnets shift in the opposite directions to each other. When the positional shifts of the neighboring permanent magnets 15 are made in the opposite directions to each other as illustrated in FIG. 6, the complex vectors are as shown in FIG. 7. The total number of the complex vectors is ten, each of which is shifted by 36 degrees, as shown in FIG. 7. The sum of the ten complex vectors becomes the zero vector. Therefore, the order component whose order is equal to the number of slots is not generated.

Figure 8A:
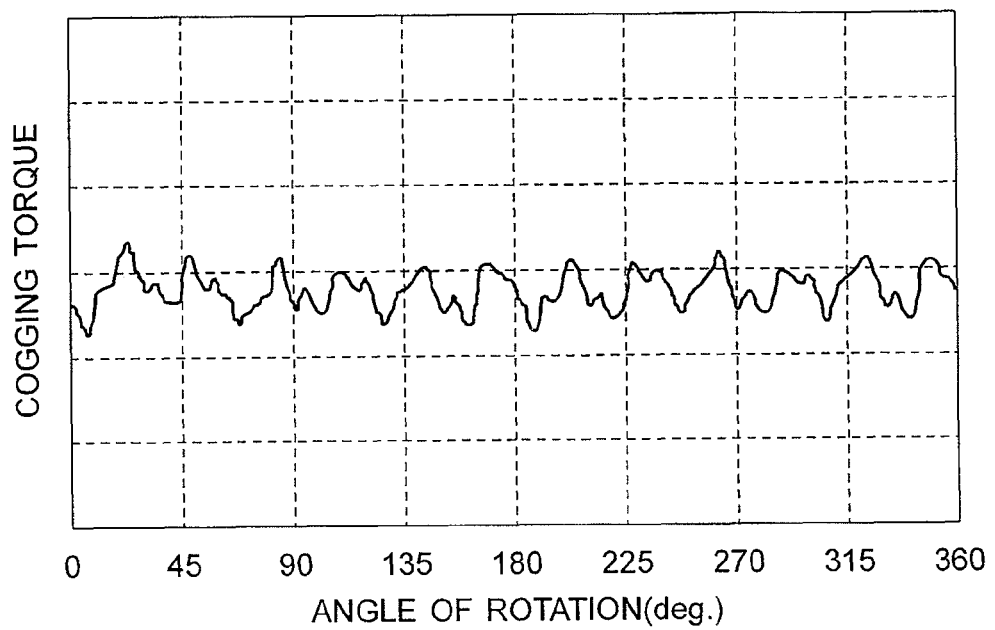
FIG. 8 are graphs respectively showing a cogging torque waveform of an experimental motor having ten poles and twelve slots, in which directions of positional shifts of all the permanent magnets are the same, and the result of analysis of a frequency.
Figure 8B:
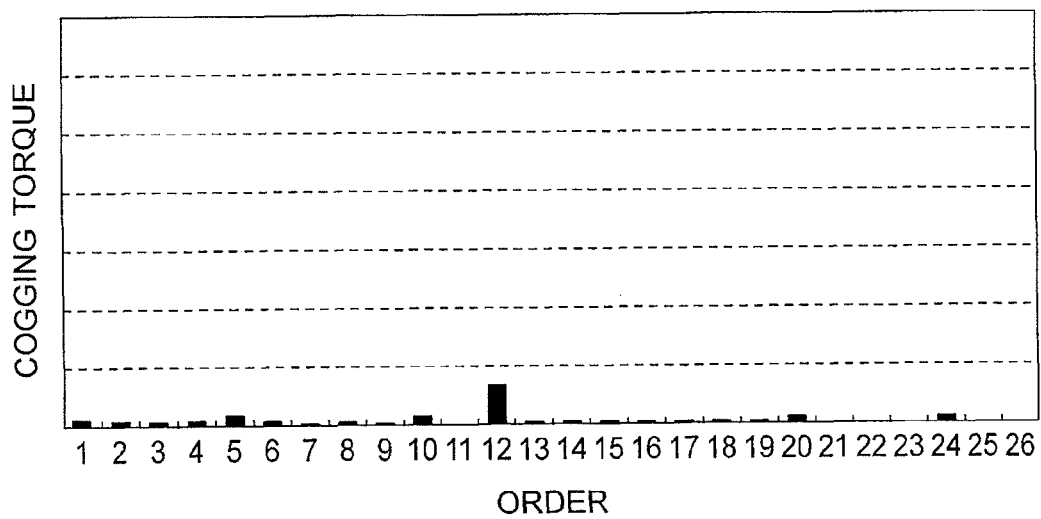

FIG. 8 are graphs respectively showing a cogging torque waveform of an experimental motor having ten poles and twelve slots, in which the directions of the positional shifts of all the permanent magnets are the same, and the result of analysis of a frequency. In comparison with the conventional example shown in FIG. 28, it is understood that the amplitude of the cogging torque is remarkably reduced. Confirming with the order components, the order component whose order is equal to the number of slots, that is, a twelfth-order component is remarkably reduced. Thus, the effects of the present invention can be confirmed.

Further, when the directions of the positional shifts of all the permanent magnets are the same or the directions of the positional shifts of the neighboring permanent magnets are opposite to each other, control is easy in comparison with the case where each of the permanent magnets vary in different positional relations and, in addition, the sum of the complex vectors becomes zero. Moreover, because the positional shift pattern as described above can be realized by providing a mechanism of arranging each of the permanent magnets so as to be shifted to one side in a production facility, productivity is also improved.

As described above, in the permanent magnet type rotating electric machine including the rotor 10 including the rotor core 11 and the plurality of permanent magnets 15, and the stator 20 including the stator core 21 and the armature windings 25, if the permanent magnets 15 have a configuration in which the directions of the circumferential positional shifts from the equiangularly arranged reference positions, each corresponding to the center of each side of the polygon, are the same at the magnetic poles of all the permanent magnets 15 (the permanent magnets are arranged so as to be shifted to one side), the effects of the circumferential positional shifts cancel each other. Therefore, the effects of reducing the order component whose order is equal to the number of slots of the stator 20 among the order components of the cogging torque are obtained. Moreover, because the cogging torque can be reduced without controlling the symmetry, the productivity can be improved. Further, because all the positions of the permanent magnets 15 shift in the same direction, the effects of improving the productivity are also obtained.

Moreover, with the configuration in which the directions of the circumferential positional shifts of the permanent magnets 15 from the equiangularly arranged reference positions, each corresponding to the center of each side of the polygon, are opposite to each other at the magnetic poles of the neighboring permanent magnets 15, the effects of the circumferential positional shifts cancel each other. Therefore, the effects of reducing the order component whose order is equal to the number of slots of the stator 20 among the order components of the cogging torque are obtained. Moreover, because the cogging torque can be reduced without controlling the symmetry, the productivity can be improved. Further, the neighboring permanent magnets 15 shift in the directions opposite to each other, and hence the effects of improving the productivity are also obtained.

Further, for generalization, the description is given using an equation. Let the number of poles be M (M is an integer) and the number of slots be N (N is an integer). Moreover, let the M permanent magnets be sequentially numbered with first to M-th in the circumferential direction. When the circumferential positional shift amount from the corresponding one of the equiangularly arranged reference positions, each corresponding to the center of each side of the polygon, for the i-th (i=1, 2, . . . , M) permanent magnet is $h_i$ (i=1, 2, . . . , M) (including the sign), M complex vectors can be defined.

A phase angle between the complex vectors for the i-th permanent magnet is $2\pi N(i-1)/M$ (rad). Then, M vectors in total, which are obtained by multiplying unit vectors which have the direction indicated by the phase angle by the shift amount $h_i$, become the complex vectors for the i-th permanent magnet. When the sum of the complex vectors is small, the order component whose order is equal to the number of slots of the stator can be reduced among the order components of the cogging torque.

For example, if the sum is smaller than a maximum value of an absolute value of the positional shift amount $h_i$ (i= 1, 2, . . . , M), only the effects smaller than those of the positional shift amount for one of the M permanent magnets appear in the cogging torque. Therefore, the effects of reducing the cogging torque are obtained.

The description using the equation will be as follows. Let the number of poles be M (M is an integer) and the number of slots be N (N is an integer). Moreover, let the M permanent magnets be sequentially numbered with first to M-th in the circumferential direction. When the circumferential positional shift amount from the corresponding one of the equiangularly arranged reference positions, each corresponding to the center of each side of the polygon, for the i-th (i=1, 2, . . . , M) permanent magnet is $h_i$ (i=1, 2, . . . , M) (including the sign), a complex vector K is defined as being expressed by the following Equation.

$$K = \sum_{i=1}^{M} h_i e^{j\frac{2\pi N}{M}(i-1)} \quad \text{[Equation 1]}$$

In the equation, e is a base of a natural logarithm, and j is an imaginary unit. If the complex vector K is reduced, the order component whose order is equal to the number of slots of the stator can be reduced among the order components of the cogging torque. For example, the complex vector K is set smaller than the maximum value of the absolute value of the positional shift amount $h_i$ (i=1, 2, . . . , M). Desirably, the complex vector K is set to zero.

The positional shift amount of the permanent magnet, which is equal to or small than about 10% of a circumferential width of each permanent magnet, is effective. For example, in the case of the permanent magnets, each having a width of 10 mm, the effects of reducing the order component whose order is equal to the number of slots of the stator 20 among the order components of the cogging torque are obtained with a shift of 1 mm. The positional shift amount of the permanent magnet is not necessarily required to be large. Even with an extremely small amount corresponding to about 0.1% to 1% of the circumferential width of each permanent magnet, the effects of the present invention are demonstrated. Further, because magnetic symmetry is scarcely impaired with the shift amount as small as about 0.1% to 1% of the circumferential width of each permanent magnet, the effects are also obtained in that motor characteristics scarcely vary depending on a rotating direction of the motor (whether the motor rotates in a forward direction or a reverse direction).

Moreover, although described in detail in a second embodiment below, the cogging torque is increased by shape deviations of the permanent magnets. With the positional shift pattern of the permanent magnets described in the first embodiment, however, the cogging torque can be reduced without controlling the shape deviations of the permanent magnets.

Figure 9A:
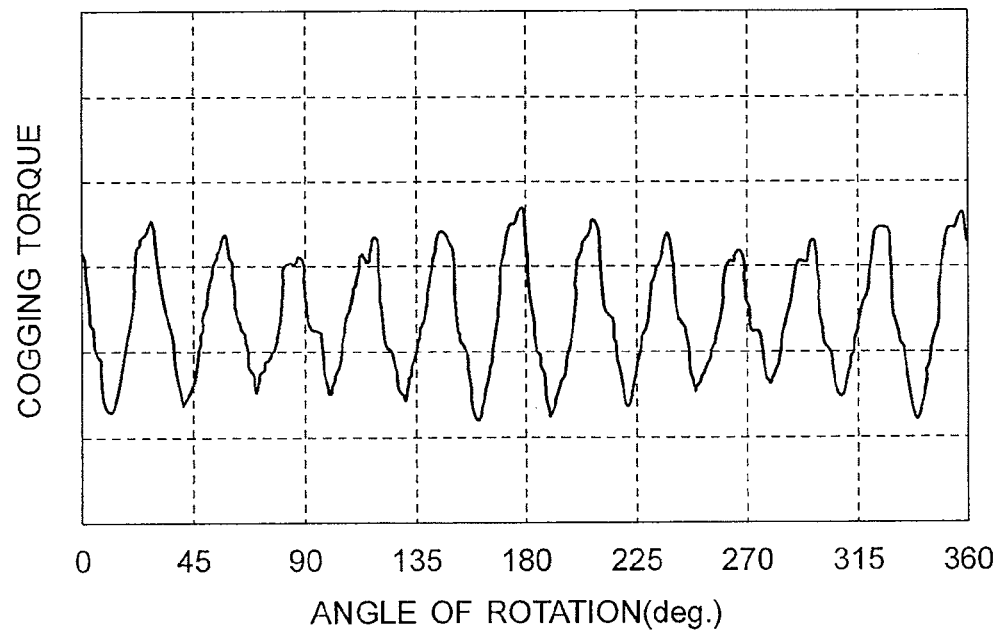
FIG. 9 are views respectively showing a cogging torque waveform of an experimental motor having ten poles and twelve slots and the result of analysis of a frequency in the case where the effects of shape deviations are the greatest when the directions of the positional shifts of all the permanent magnets are the same.
Figure 9B:
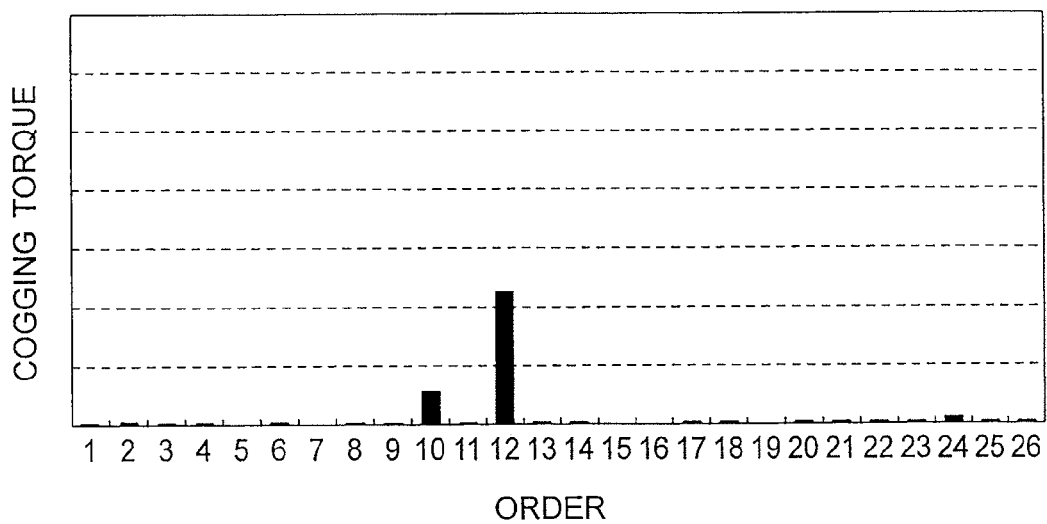

FIG. 9 are views respectively showing a cogging torque waveform of an experimental motor having ten poles and twelve slots and the result of analysis of a frequency in the case where the effects of the shape deviations are the greatest when the directions of the positional shifts of all the permanent magnets are the same. In this case, the motor is produced experimentally, supposing the case where the effects of the shape deviations of the permanent magnets are the greatest. Even in this case, the cogging torque can be remarkably reduced in comparison with the conventional example shown in FIG. 28. Hence, by the application of the first embodiment, the effects of reducing the cogging torque even without controlling the shape deviations of the permanent magnets can be obtained.

By applying the first embodiment as described above to, for example, an industrial servomotor, a motor for a hoisting machine for an elevator, a motor for a vehicle, and the like, which require a reduced cogging torque, the effects of reducing the cogging torque can be obtained. For FIGS. 23 and 24, the description is given below.

Second Embodiment

Figure 10:
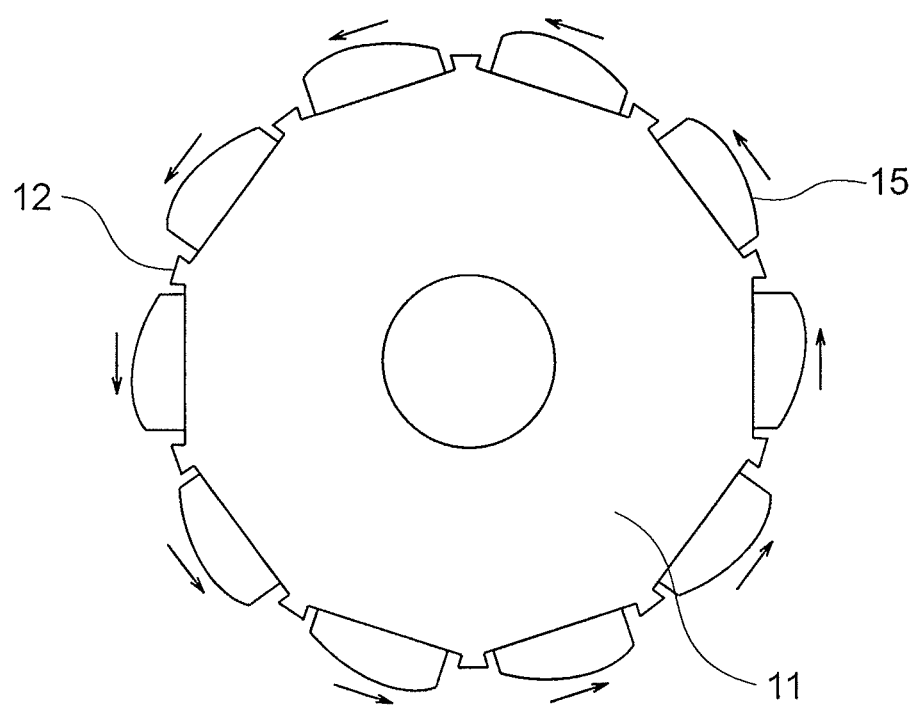
FIG. 10 is a view illustrating a first configuration of a rotor of a permanent magnet type rotating electric machine according to a second embodiment of the present invention.

A permanent magnet type rotating electric machine according to a second embodiment of the present invention is described referring to FIGS. 10 to 15, 25, and 26. FIG. 10 is a view illustrating a first configuration of the rotor of the permanent magnet type rotating electric machine according to the second embodiment of the present invention.

As illustrated in FIG. 10, the rotor 10 of the permanent magnet type rotating electric machine according to the second embodiment of the present invention includes the rotor core 11, the plurality of projecting portions 12, and the plurality of permanent magnets 15 arranged on the periphery of the rotor core 11. Arrows indicate a direction in which the shapes of the permanent magnets 15 deviate.

Next, an operation of the permanent magnet type rotating electric machine according to the second embodiment is described referring to the drawings.

Although the positional shifts of the permanent magnets have been described in the aforementioned first embodiment, the cogging torque which is generated in the case where the shapes deviate can also be discussed by defining the complex vector in the same manner.

Figure 11:
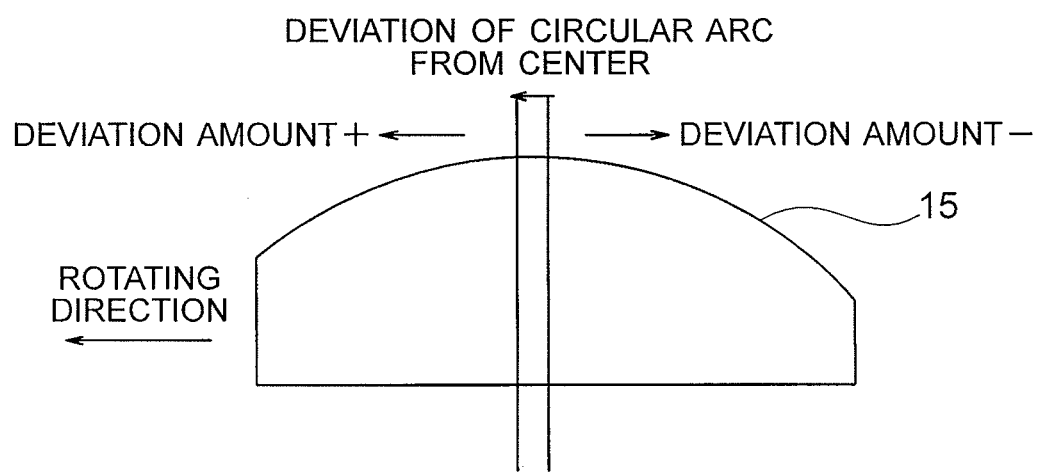
FIG. 11 is a view for describing the shape deviation of the permanent magnet.

For the shape deviations due to a fabrication error, the facts as illustrated in FIG. 11 are considered. In the permanent magnet 15 having a half-barrel like lateral surface (cross section) formed by straight lines and a circular arc, a center of the circular arc deviates from a horizontal center thereof, resulting in an asymmetrical shape.

The complex vector has three characteristics as follows with respect to a shape deviation amount.

(1) The complex vector is in proportion to the shape deviation amount.

(2) The phase difference between the permanent magnets is $2\pi N/M$ (rad).

(3) When the direction of the deviation becomes opposite, the phase is inverted.

Therefore, using those characteristics, a method of reducing the cogging torque is considered.

When there is no shape deviation at all for all the permanent magnets, all the complex vectors become a zero vector. Therefore, it is apparent that the cogging torque of the order component whose order is equal to the number of slots is not generated. On the other hand, when there is the shape deviation, the sum of the complex vectors does not generally become zero and the cogging torque of the order component whose order is equal to the number of slots is generated, resulting in an increase in the cogging torque. Depending on the shape deviation pattern, however, the cogging torque of the order component whose order is equal to the number of slots is hardly generated or is not generated at all when the sum of the complex vectors is extremely small or becomes the zero vector.

For example, when the shape deviations of all the permanent magnets 15 are made in the same direction as illustrated in FIG. 10, the complex vectors are as illustrated in FIG. 4. FIG. 4 shows that the directions of the complex vectors of the permanent magnets P1 and P6 are the same. In addition, the directions of the complex vectors are the same for each set of "the permanent magnets P2 and P7", "the permanent magnets P3 and P8", "the permanent magnets P4 and P9", and "the permanent magnets P5 and P10". The total number of complex vectors is ten, each of which is shifted by 72 degrees. The sum of the ten complex vectors becomes the zero vector. Therefore, the order component whose order is equal to the number of slots is not generated.

Figure 12:
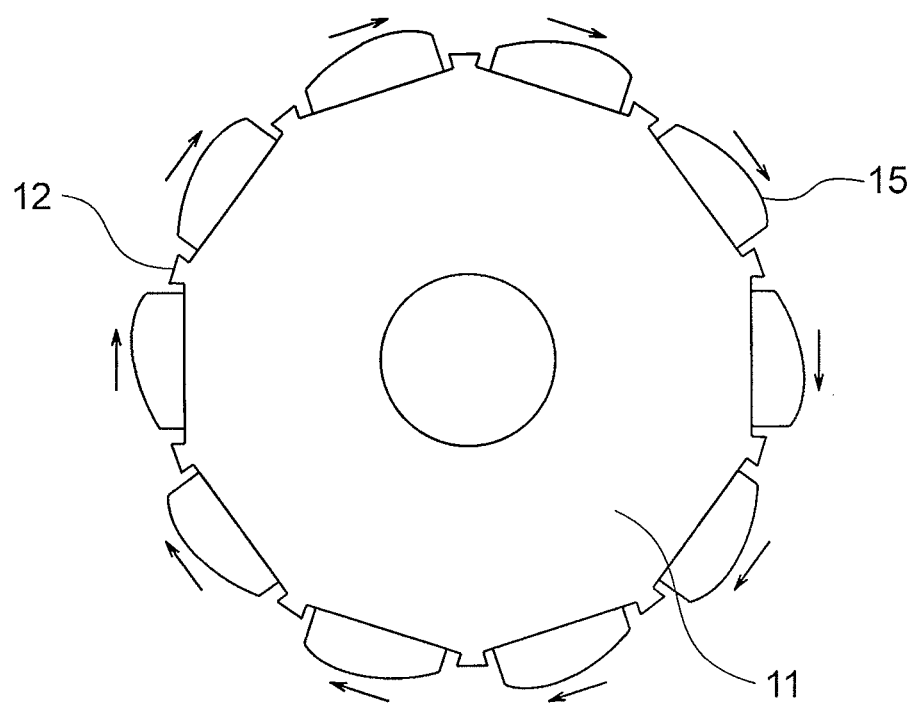
FIG. 12 is a view illustrating a second configuration of the rotor of the permanent magnet type rotating electric machine according to a second embodiment of the present invention.

FIG. 12 is a view illustrating a second configuration of the rotor of the permanent magnet type rotating electric machine according to the second embodiment of the present invention. The same effects are obtained even when the directions of the shape deviations of all the permanent magnets 15 are opposite to the direction of FIG. 10, as illustrated in FIG. 12.

Figure 13:
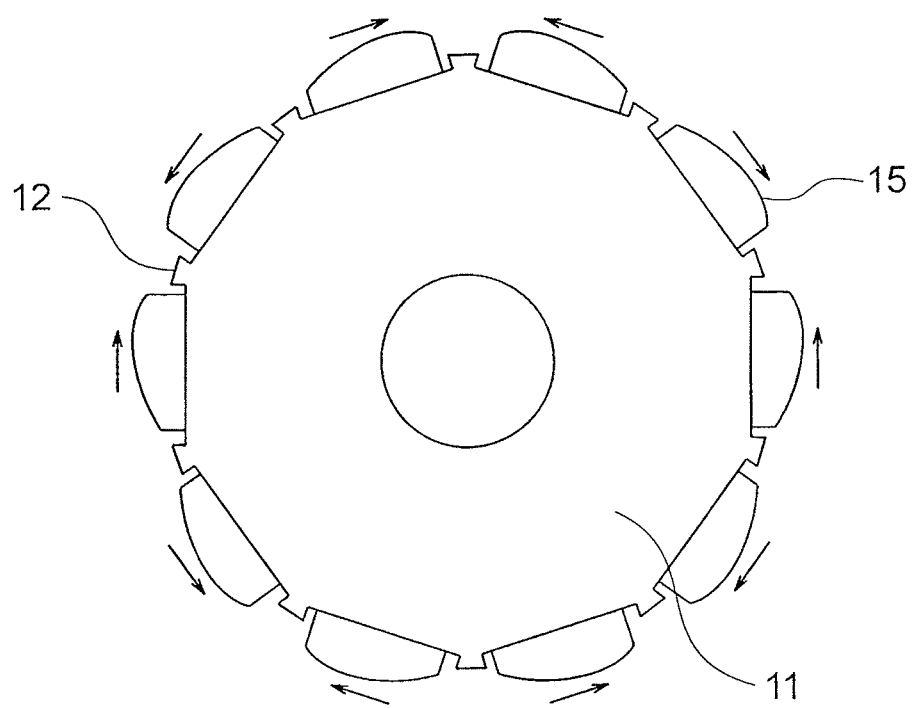
FIG. 13 is a view illustrating a third configuration of the rotor of the permanent magnet type rotating electric machine according to the second embodiment of the present invention.

FIG. 13 is a view illustrating a third configuration of the rotor of the permanent magnet type rotating electric machine according to the second embodiment of the present invention. When the shape deviations of the neighboring permanent magnets are made in the opposite directions to each other as illustrated in FIG. 13, the complex vectors are as shown in FIG. 7. The total number of the complex vectors is ten, each of which is shifted by 36 degrees. The sum of the ten complex vectors becomes the zero vector. Therefore, the order component whose order is equal to the number of slots is not generated.

A motor having ten poles and twelve slots, in which the directions of the shape deviations of all the permanent magnets 15 are the same, is experimentally produced. When the cogging torque is measured, the same results of measurement as the cogging torque waveform and the result of analysis of the frequency shown in FIG. 8 are obtained. In comparison with the conventional example shown in FIG. 28, the amplitude of the cogging torque is remarkably reduced. Confirming the reduction in the order components, the order component whose order is equal to the number of slots, that is, the twelfth order component is remarkably reduced.

Further, when the directions of the shape deviations of all the permanent magnets 15 are the same or the directions of the shape deviations of the neighboring permanent magnets 15 are opposite to each other, control is easy in comparison with the case where each of the permanent magnets 15 vary in a different directions and, in addition, the sum of the complex vectors becomes zero.

As described above, in the permanent magnet type rotating electric machine including the rotor 10 including the rotor core 11 and the plurality of permanent magnets 15, and the stator 20 including the stator core 21 and the armature windings 25, if the permanent magnets 15 have a configuration in which the directions of the shape deviations are the same at the magnetic poles of all the permanent magnets 15, the effects of the shape deviations (symmetry) of the magnets cancel each other. Therefore, the effects of reducing the order component whose order is equal to the number of slots of the stator 20 among the order components of the cogging torque are obtained. Moreover, because the cogging torque can be reduced without controlling the shape deviations of the permanent magnets 15, the productivity can be improved. Further, because all the shapes of the permanent magnets 15 deviate in the same direction, the effects of improving the productivity are also obtained.

Moreover, with the configuration in which the directions of the shape deviations of the permanent magnets 15 are opposite to each other at the magnetic poles of the neighboring permanent magnets 15, the effects of the shape deviations (symmetry) of the magnets cancel each other. Therefore, the effects of reducing the order component whose order is equal to the number of slots of the stator 20 among the order components of the cogging torque are obtained. Moreover, because the cogging torque can be reduced without controlling the shape deviations of the permanent magnets 15, the productivity can be improved. Further, the shapes of the neighboring permanent magnets 15 deviate in the directions opposite to each other, and hence the effects of improving the productivity are also obtained.

Further, for generalization, the description is given using an equation. Let the number of poles be M (M is an integer) and the number of slots be N (N is an integer). Moreover, let the M permanent magnets be sequentially numbered with first to M-th in the circumferential direction. When the shape deviation amount for the i-th (i=1, 2, . . . , M) permanent magnet is $c_i$ (i=1, 2, . . . , M) (including the sign), M complex vectors can be defined.

A phase angle between the complex vectors for the i-th permanent magnet is $2\pi N(i-1)/M$ (rad). Then, M complex vectors in total, which are obtained by multiplying unit vectors which have the direction indicated by the phase angle by the shift amount $c_i$, become the complex vectors for the i-th permanent magnet. When the sum of the complex vectors is small, the order component whose order is equal to the number of slots of the stator can be reduced among the order components of the cogging torque.

For example, if the sum is smaller than a maximum value of an absolute value of the shape deviation amount $c_i$ (i=1, 2, . . . , M), only the effects smaller than those of the shape deviation amount for one of the M permanent magnets appear in the cogging torque. Therefore, the effects of reducing the cogging torque are obtained.

The description using the equation is as follows. Let the number of poles be M (M is an integer) and the number of slots be N (N is an integer). Moreover, let the M permanent magnets be sequentially numbered with first to M-th in the circumferential direction. When the shape deviation amount for the i-th (i=1, 2, . . . , M) permanent magnet is $c_i$ (i=1, 2, . . . , M) (including the sign), a complex vector K is defined as being expressed by the following Equation.

$$K = \sum_{i=1}^{M} c_i e^{j\frac{2\pi N}{M}(i-1)} \quad \text{[Equation 2]}$$

In the equation, e is a base of a natural logarithm, and j is an imaginary unit. If the complex vector K is reduced, the order component whose order is equal to the number of slots of the stator can be reduced among the order components of the cogging torque. For example, the complex vector K is set smaller than the maximum value of the absolute value of the shape deviation amount $c_i$ (i=1, 2, . . . , M). Desirably, the complex vector K is set to zero.

The shape deviation amount of the permanent magnet, which is equal to or small than about 10% of a circumferential width of each permanent magnet, is effective. For example, in the case of the permanent magnets, each having a width of 10 mm, the effects of reducing the order component whose order is equal to the number of slots of the stator 20 among the order components of the cogging torque are obtained with a deviation of 1 mm. The shape deviation amount of the permanent magnet is not necessarily required to be large. Even with an extremely small amount corresponding to about 0.1% to 1% of the circumferential width of each permanent magnet, the effects of the present invention are demonstrated. Further, because magnetic symmetry is scarcely impaired with the shift amount as small as about 0.1% to 1% of the circumferential width of each permanent magnet, the effects are also obtained in that motor characteristics scarcely vary depending on a rotating direction of the motor (whether the motor rotates in a forward direction or a reverse direction).

Figure 14:
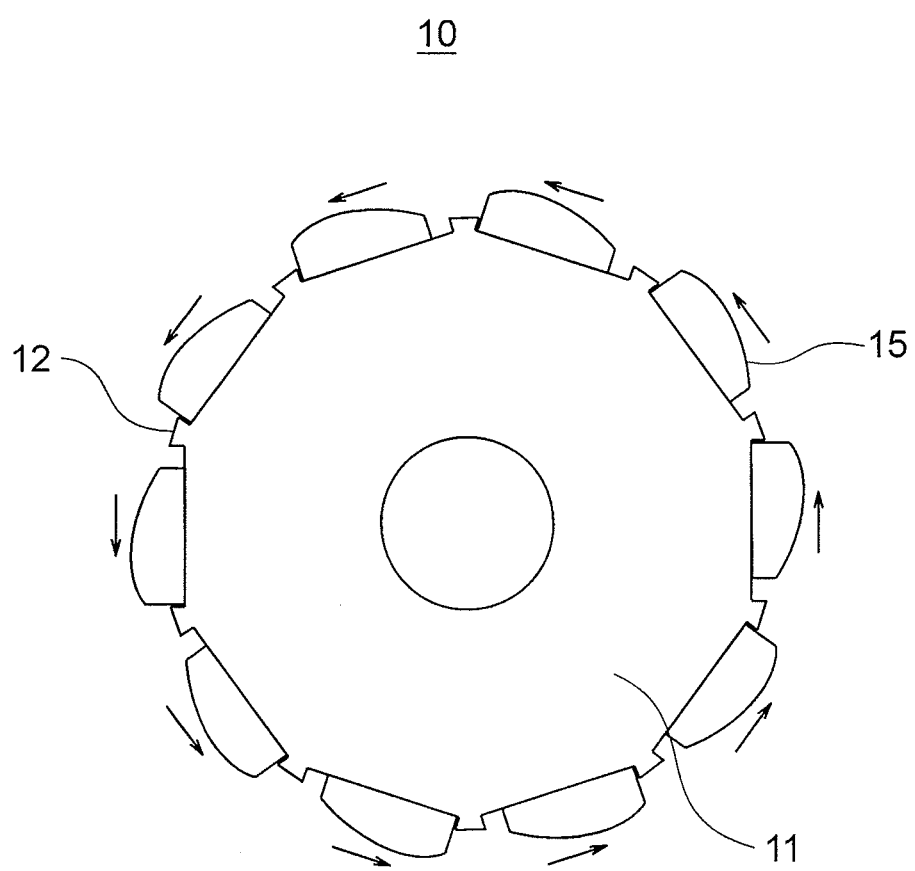
FIG. 14 is a view illustrating a fourth configuration of the rotor of the permanent magnet type rotating electric machine according to the second embodiment of the present invention.

FIG. 14 is a view illustrating a fourth configuration of the rotor of the permanent magnet type rotating electric machine according to the second embodiment of the present invention. FIG. 14 shows that the positional shifts and the shape deviations of the permanent magnets 15 are both made in the same direction. Because the effects of the positional shifts and the effects of the shape deviations cancel each other in such a case, the order component of the cogging torque, whose order is equal to the number of slots, can be remarkably reduced.

Figure 15:
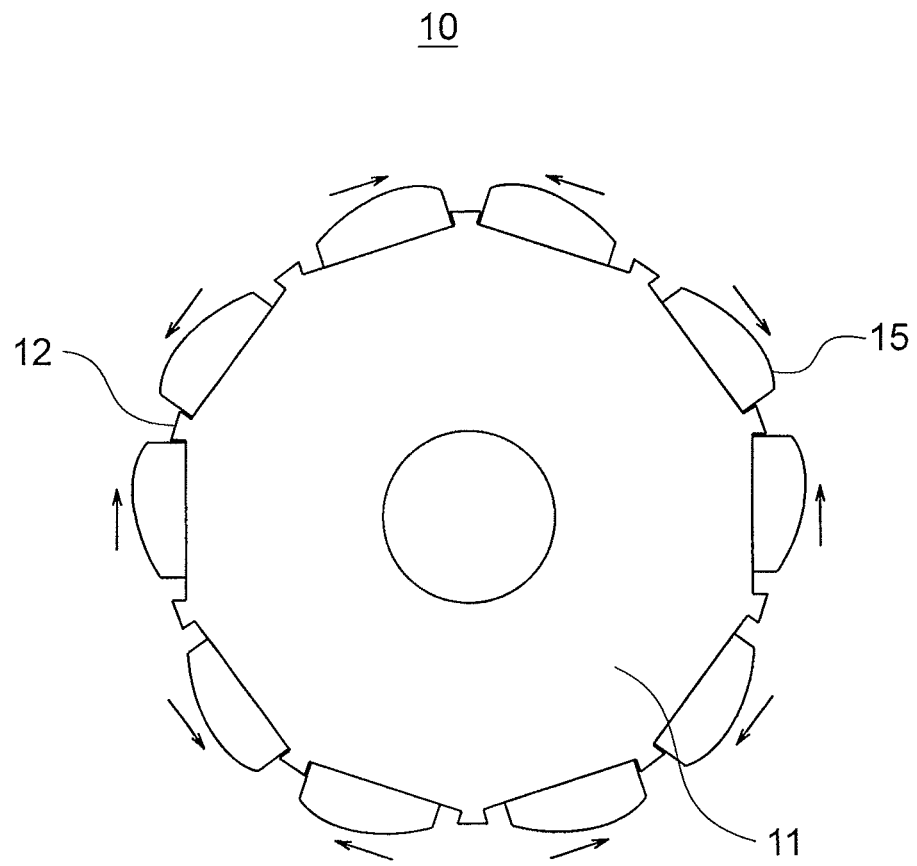
FIG. 15 is a view illustrating a fifth configuration of the rotor of the permanent magnet type rotating electric machine according to the second embodiment of the present invention.

FIG. 15 is a view illustrating a fifth configuration of the rotor of the permanent magnet type rotating electric machine according to the second embodiment of the present invention. FIG. 15 shows that the positional shifts and the shape deviations of the permanent magnets 15 are both made in the directions opposite to each other for the neighboring permanent magnets 15. Because the effects of the positional shifts and the effects of the shape deviations also cancel each other even in this case, the effects of remarkably reducing the order component of the cogging torque, whose order is equal to the number of slots, are obtained. For FIGS. 25 and 26, the description is given below.

Third Embodiment

Figure 16:
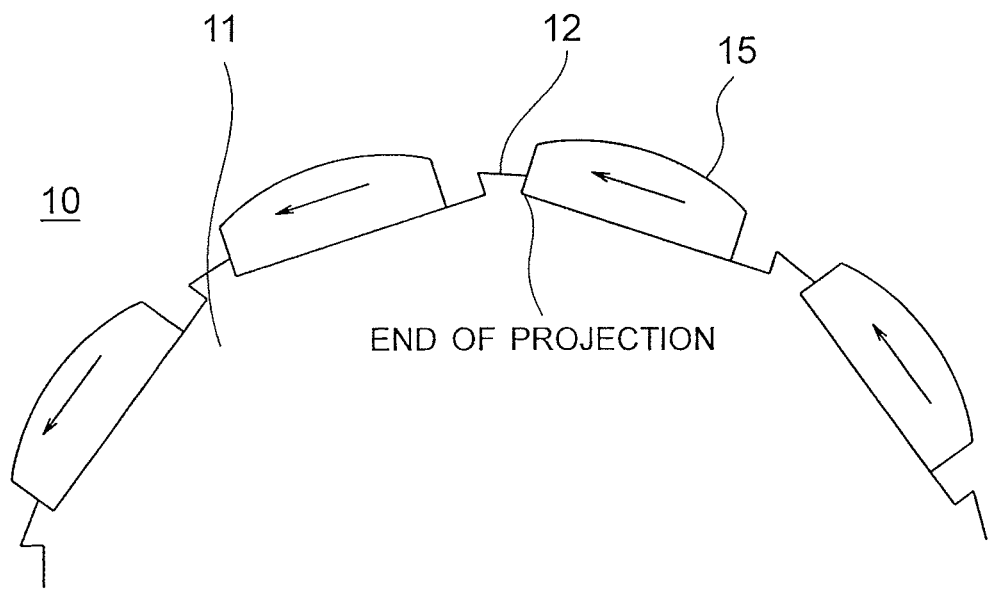
FIG. 16 is a view illustrating a rotor of a permanent magnet type rotating electric machine according to a third embodiment of the present invention in an enlarged manner.

The permanent magnet type rotating electric machine according to a third embodiment of the present invention is described referring to FIG. 16. FIG. 16 is a view illustrating the rotor of the permanent magnet type rotating electric machine according to the third embodiment of the present invention in an enlarged manner.

FIG. 16 illustrates some of the permanent magnets 15 and a part of the rotor core 11 in an enlarged manner. The permanent magnets 15 are arranged so as to be shifted to one side in the counterclockwise direction. The same number of projecting portions 12 as that of the permanent magnets 15 are equiangularly provided on the outer periphery of the rotor core 11 between the neighboring permanent magnets 15. The projecting portions 12 as described above are provided, and the permanent magnets 15 are shifted in the circumferential direction until the permanent magnets 15 abut against the projecting portions 12. As a result, the positioning can be performed. Thus, the positional shift pattern of the permanent magnets 15 as described in the first embodiment can be easily realized. As a result, the effects of reducing the order component whose order is equal to the number of slots of the stator 20 among the order components of the cogging torque are obtained.

Fourth Embodiment

Figure 17:
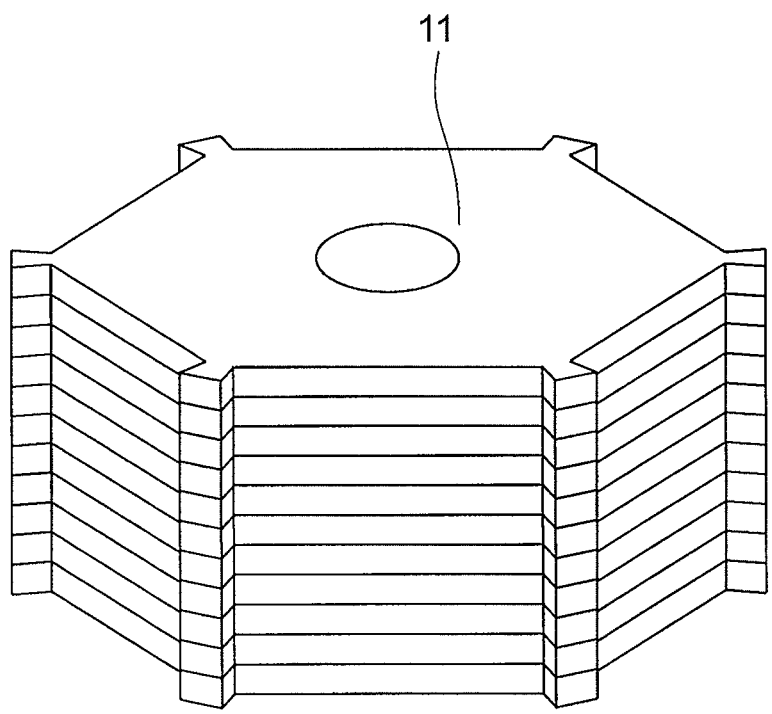
FIG. 17 is a perspective view illustrating a rotor core of a permanent magnet type rotating electric machine according to a fourth embodiment of the present invention.

A permanent magnet type rotating electric machine according to a fourth embodiment of the present invention is described referring to FIG. 17. FIG. 17 is a perspective view illustrating the rotor core of the permanent magnet type rotating electric machine according to the fourth embodiment of the present invention.

FIG. 17 described above illustrates an example where the rotor core 11 is a laminate core. FIG. 17 is a view of the laminate core as viewed from an angle, in which the illustration of the permanent magnets is omitted. The laminate core is formed by laminating, for example, plate-like materials such as electromagnetic steel plates. The laminate core is effective in that the projecting portions 12 can be easily realized by punching out the electromagnetic steel plates with a die. When the directions of the positional shifts of the permanent magnets are made to be all the same, specifically, when the permanent magnets are arranged so as to be shifted to one side in the case where the rotor core 11 is formed of a massive core such as a shaft (rotating shaft), the permanent magnet and the shaft are short-circuited in a portion (each of the projecting portions), against which each of the permanent magnets is shifted to one side to abut, to form an electric circuit. Because an eddy current is likely to flow through the electric circuit, heat generated by an eddy current loss is large. Therefore, there is a fear of lowered efficiency, occurrence of heat demagnetization, or the like. On the other hand, when the rotor core is formed of the laminate core, the eddy current loss is small because a contact resistance between the laminate core and the permanent magnets is large. Therefore, the reduction in the cogging torque and enhanced efficiency can be achieved at the same time. In addition, the effects of preventing the heat demagnetization are obtained.

Fifth Embodiment

Figure 18:
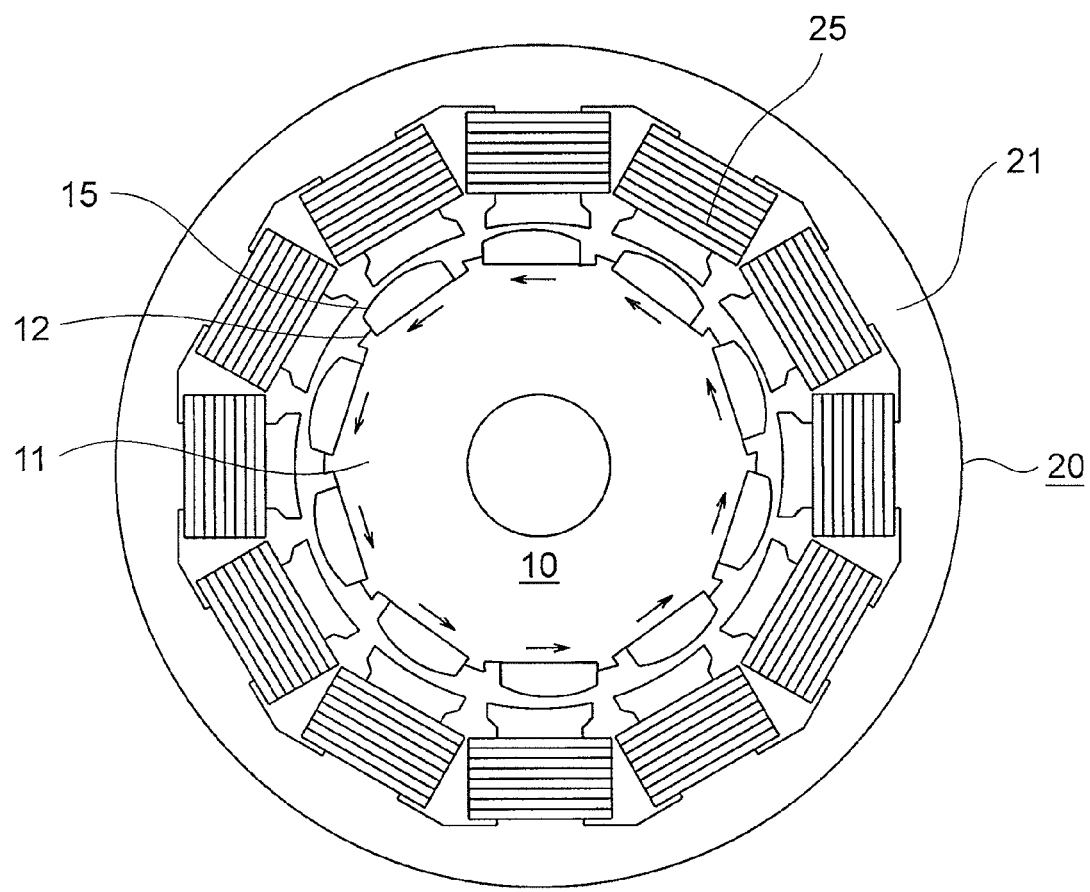
FIG. 18 is a view illustrating a first configuration of a permanent magnet type rotating electric machine according to a fifth embodiment of the present invention.
Figure 19:
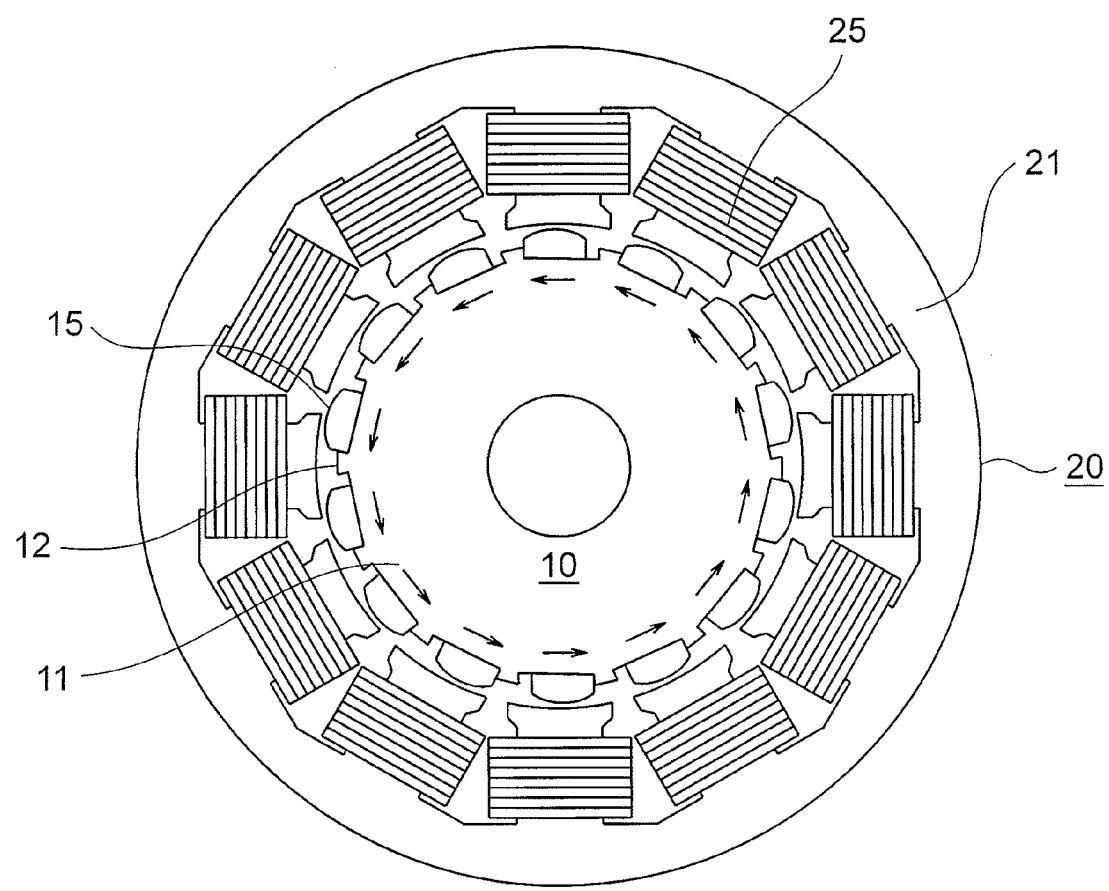
FIG. 19 is a view illustrating a second configuration of the permanent magnet type rotating electric machine according to the fifth embodiment of the present invention.

A permanent magnet type rotating electric machine according to a fifth embodiment of the present invention is described referring to FIGS. 18 and 19. FIG. 18 is a view illustrating a first configuration of the permanent magnet type rotating electric machine according to the fifth embodiment of the present invention. FIG. 19 is a view illustrating a second configuration of the permanent magnet type rotating electric machine according to the fifth embodiment of the present invention.

FIG. 18 illustrates the permanent magnet type motor having "10" poles and "12" slots. As an indication of the degree of the cogging torque, a least common multiple of the number of poles and the number of slots is known. As the least common multiple becomes larger, the cogging torque is regarded as becoming smaller. For the motor illustrated in FIG. 18, the least common multiple is "60".

For example, if the number of slots is similarly "12" and the number of poles is different, that is, "8", the least common multiple is "24". Therefore, in this case, it is understood that the cogging torque tends to be smaller for the motor having ten poles and twelve slots, which has the same number of slots but the larger least common multiple. However, this result is obtained supposing a state where there is no variation in position or shape between the permanent magnets 15. Therefore, for actual mass production of the motors, it is necessary to take variations in position or shape between the permanent magnets 15 into consideration. The motor having the larger least common multiple of the number of poles and the number of slots is more prone to the effects of such variations.

Accordingly, as indicated by directions of arrows shown in FIG. 18, the configuration is such that the positions of the permanent magnets 15 shift and the shapes thereof deviate in the same direction. As a result, the effects of reducing the order component whose order is equal to the number of slots of the stator 20 among the order components of the cogging torque are obtained.

Although not shown, it is apparent that the same effects are obtained even when the positions of the neighboring permanent magnets 15 shift or the shapes thereof deviate in the directions opposite to each other. Moreover, the same effects are obtained with the positional patterns of the magnets as described above in the first to fourth embodiments.

FIG. 19 illustrates the permanent magnet type motor having "14" poles and "12" slots. As an indication of the degree of the cogging torque, a least common multiple of the number of poles and the number of slots is known. As the least common multiple becomes larger, the cogging torque is regarded as becoming smaller. For the motor illustrated in FIG. 19, the least common multiple is "84".

For example, if the number of slots is similarly "12" and the number of poles is different, that is, "8", the least common multiple is "24". Therefore, in this case, it is understood that the cogging torque tends to be smaller for the motor having fourteen poles and twelve slots, which has the same number of slots but the larger least common multiple. However, this result is obtained supposing a state where there is no variation in position or shape between the permanent magnets 15. Therefore, for actual mass production of the motors, it is necessary to take variations in position or shape between the permanent magnets 15 into consideration. The motor having the larger least common multiple of the number of poles and the number of slots is more prone to the effects of such variations.

Accordingly, as indicated by directions of arrows shown in FIG. 19, the configuration is such that the positions of the permanent magnets 15 shift and the shapes thereof deviate in the same direction. As a result, the effects of reducing the order component whose order is equal to the number of slots of the stator 20 among the order components of the cogging torque are obtained.

Although not shown, it is apparent that the same effects are obtained even when the positions of the neighboring permanent magnets 15 shift or the shapes thereof deviate in the directions opposite to each other. Moreover, the same effects are obtained with the positional patterns of the magnets as described above in the first to fourth embodiments.

In general, when the number of poles M and the number of slots N are respectively expressed by $M=12n\pm 2n$ and $N=12n$ (n is an integer equal to or larger than 1), the least common multiple is larger than that in the case of $M=2n$ and $N=3n$ or the case of $M=4n$ and $N=3n$ (n is an integer equal to or larger than 1), which are often conventionally used, if any one of the number of poles M or the number of slots N is the same. Therefore, by the effects of the variations between the permanent magnets, the cogging torque tends to be increased.

However, the configuration, in which the positions of the permanent magnets 15 shift and the shapes thereof deviate in the same direction, is used in the fifth embodiment. As a result, the effects of reducing the order component whose order is equal to the number of slots of the stator 20 among the order components of the cogging torque are obtained. Moreover, although not shown, it is apparent that the same effects are obtained even when the positions of the neighboring permanent magnets 15 shift and the shapes thereof deviate in the directions opposite to each other. Further, the same effects are obtained with the positional patterns of the magnets as described above in the first to fourth embodiments.

Sixth Embodiment

Figure 20:
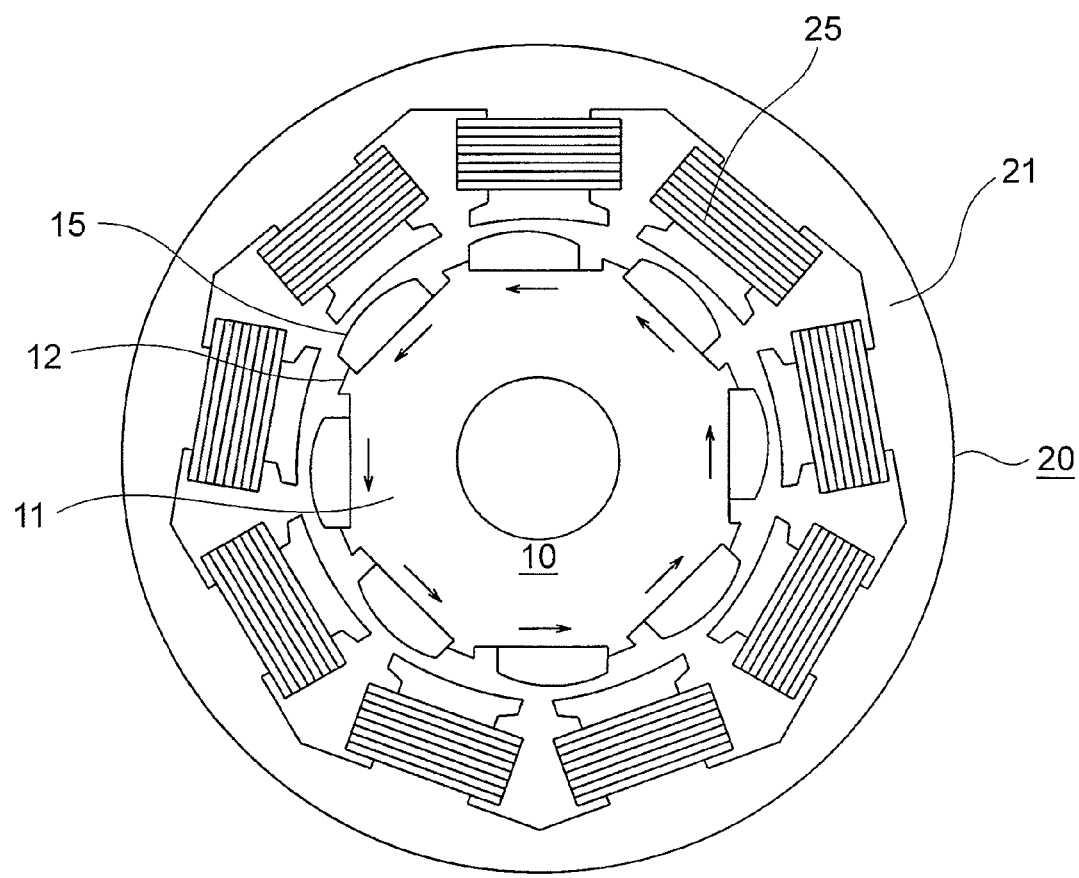
FIG. 20 is a view illustrating a first configuration of a permanent magnet type rotating electric machine according to a sixth embodiment of the present invention.
Figure 21:
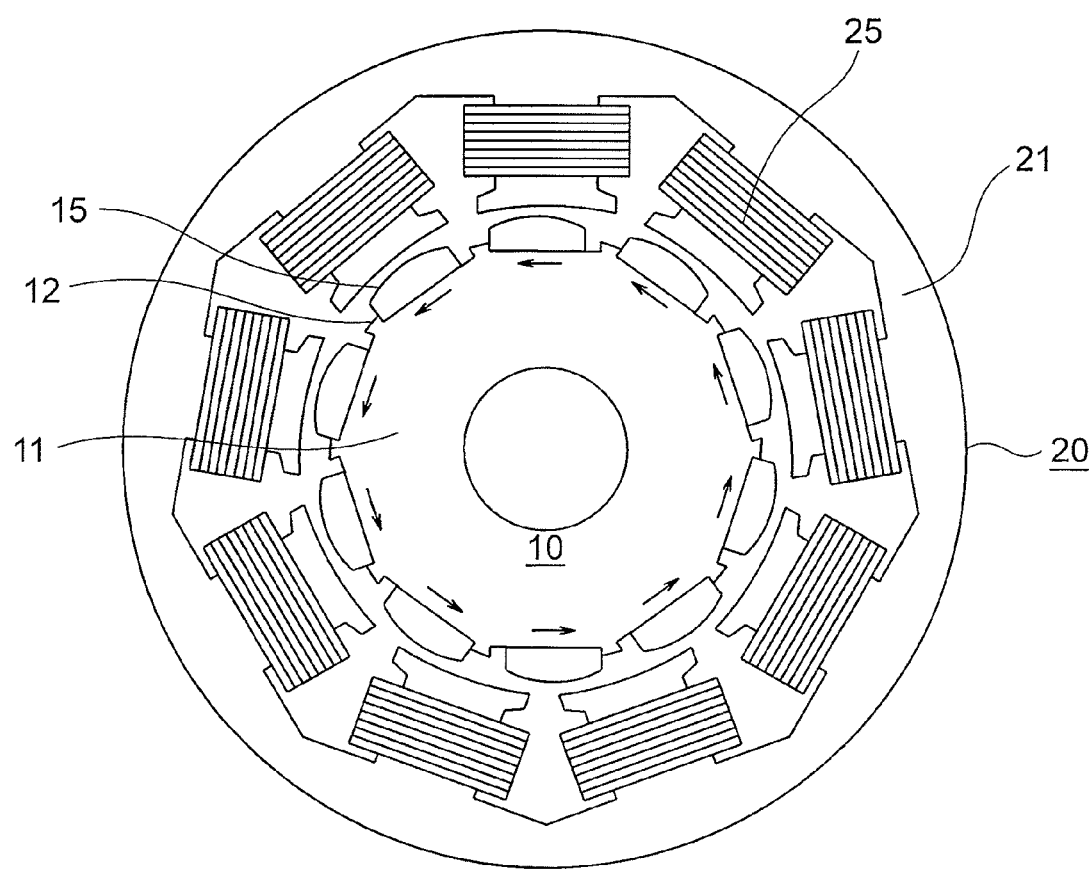
FIG. 21 is a view illustrating a second configuration of the permanent magnet type rotating electric machine according to the sixth embodiment of the present invention.

A permanent magnet type rotating electric machine according to a sixth embodiment of the present invention is described referring to FIGS. 20 and 21. FIG. 20 is a view illustrating a first configuration of the permanent magnet type rotating electric machine according to the sixth embodiment of the present invention. FIG. 21 is a view illustrating a second configuration of the permanent magnet type rotating electric machine according to the sixth embodiment of the present invention.

FIG. 20 illustrates the permanent magnet type motor having "8" poles and "9" slots. As an indication of the degree of the cogging torque, a least common multiple of the number of poles and the number of slots is known. As the least common multiple becomes larger, the cogging torque is regarded as becoming smaller. For the motor illustrated in FIG. 20, the least common multiple is "72".

For example, if the number of slots is similarly "12" and the number of poles is different, that is, "8", the least common multiple is "24". Therefore, in this case, it is understood that the cogging torque tends to be smaller for the motor having eight poles and nine slots, which has the same number of slots but the larger least common multiple. However, this result is obtained supposing a state where there is no variation in position or shape between the permanent magnets 15. Therefore, for actual mass production of the motors, it is necessary to take variations in position or shape between the permanent magnets 15 into consideration. The motor having the larger least common multiple of the number of poles and the number of slots is more prone to the effects of such variations.

Accordingly, as indicated by directions of arrows shown in FIG. 20, the configuration is such that the positions of the permanent magnets 15 shift and the shapes thereof deviate in the same direction. As a result, the effects of reducing the order component whose order is equal to the number of slots of the stator 20 among the order components of the cogging torque are obtained.

Although not shown, it is apparent that the same effects are obtained even when the positions of the neighboring permanent magnets 15 shift or the shapes thereof deviate in the directions opposite to each other. Moreover, the same effects are obtained with the positional patterns of the magnets as described above in the first to fourth embodiments.

FIG. 21 illustrates the permanent magnet type motor having "10" poles and "9" slots. As an indication of the degree of the cogging torque, a least common multiple of the number of poles and the number of slots is known. As the least common multiple becomes larger, the cogging torque is regarded as becoming smaller. For the motor illustrated in FIG. 21, the least common multiple is "90".

For example, if the number of slots is similarly "12" and the number of poles is different, that is, "8", the least common multiple is "24". Therefore, in this case, it is understood that the cogging torque tends to be smaller for the motor having ten poles and nine slots, which has the same number of slots but the larger least common multiple. However, this result is obtained supposing a state where there is no variation in position or shape between the permanent magnets 15. Therefore, for actual mass production of the motors, it is necessary to take variations in position or shape between the permanent magnets 15 into consideration. The motor having the larger least common multiple of the number of poles and the number of slots is more prone to the effects of such variations.

Accordingly, as indicated by directions of arrows shown in FIG. 21, the configuration is such that the positions of the permanent magnets 15 shift and the shapes thereof deviate in the same direction. As a result, the effects of reducing the order component whose order is equal to the number of slots of the stator 20 among the order components of the cogging torque are obtained.

Although not shown, it is apparent that the same effects are obtained even when the positions of the neighboring permanent magnets 15 shift or the shapes thereof deviate in the directions opposite to each other. Moreover, the same effects are obtained with the positional patterns of the magnets as described above in the first to fourth embodiments.

In general, when the number of poles M and the number of slots N are respectively expressed by M=9n±9n and N=9n (n is an integer equal to or larger than 1), the least common multiple is larger than that in the case of M=2n and N=3n or the case of M=4n and N=3n (n is an integer equal to or larger than 1), which are often conventionally used, if any one of the number of poles M or the number of slots N is the same. Therefore, by the effects of the variations between the permanent magnets 15, the cogging torque tends to be increased.

However, the configuration, in which the positions of the permanent magnets 15 shift and the shapes thereof deviate in the same direction, is used in the sixth embodiment. As a result, the effects of reducing the order component whose order is equal to the number of slots of the stator 20 among the order components of the cogging torque are obtained. Moreover, although not shown, it is apparent that the same effects are obtained even when the positions of the neighboring permanent magnets 15 shift and the shapes thereof deviate in the directions opposite to each other.

Seventh Embodiment

Figure 22:
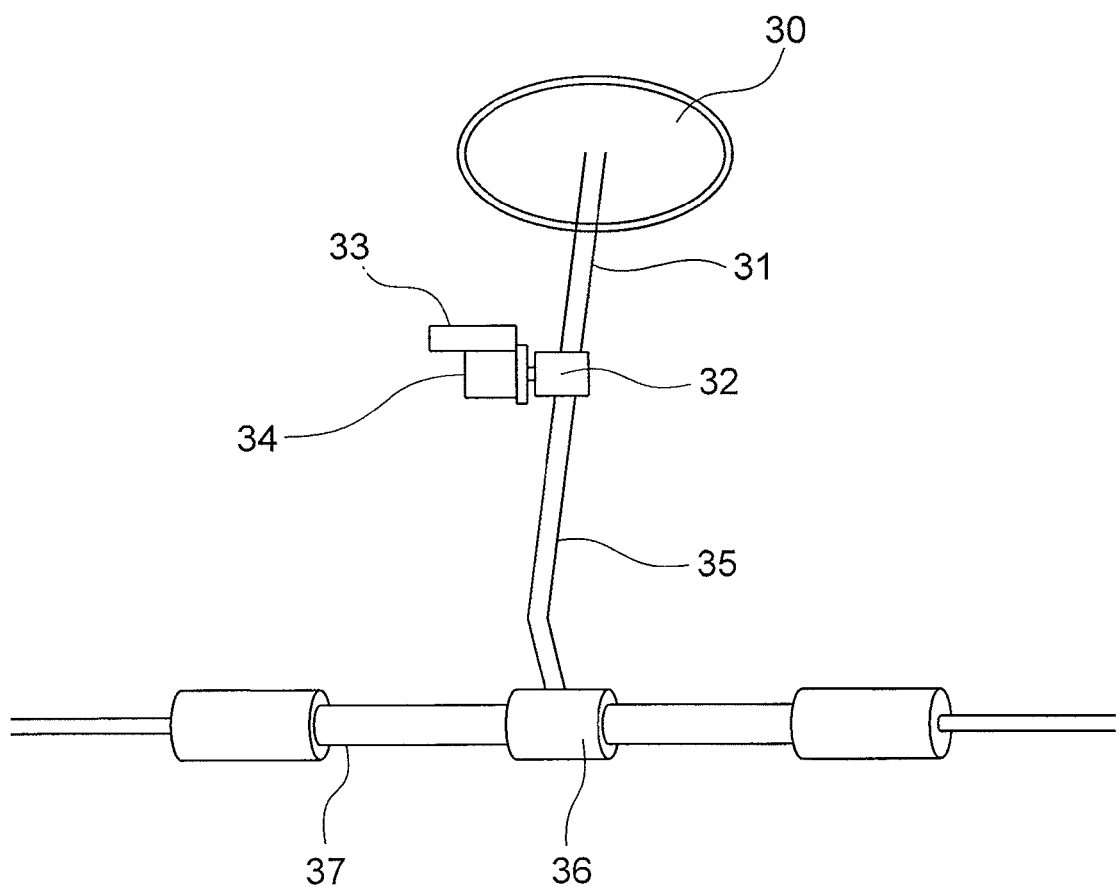
FIG. 22 is a view illustrating a schematic configuration of an electric power steering device.

An example of application of a permanent magnet type rotating electric machine according to a seventh embodiment of the present invention is described referring to FIG. 22. FIG. 22 is a view illustrating a schematic configuration of an electric power steering device.

In FIG. 22, the electric power steering device includes a column shaft 31 which is coupled to a steering wheel 30 to receive a steering force of the steering wheel 30. Further, a worm gear 32 (the details thereof are omitted in the drawing, and only a gearbox is illustrated) is connected to the column shaft 31. In this manner, the steering force is transmitted to the worm gear 32. The worm gear 32 transmits an output (toque and rpm) of a motor 34 driven by a controller 33 while changing a direction of rotation by 90 degrees and decelerating the rotation, thereby adding an assist torque of the motor 34 to the steering force.

The steering force is transmitted through a handle joint 35 connected to the worm gear 32, while the direction thereof is changed. A steering gear 36 (the details thereof are omitted in the drawing, and only a gearbox is illustrated) decelerates the rotation of the handle joint 35 and converts the rotation into a linear motion of a rack 37, thereby obtaining a required displacement. By the linear motion of the rack 37, wheels are moved to allow a vehicle to change in direction or the like.

In the electric power steering device as described above, the cogging torque generated by the motor 34 is transmitted to the steering wheel 30 through an intermediation of the worm gear 32 and the column shaft 31. Therefore, when the motor 34 generates the large cogging torque, smooth steering feel cannot be obtained.

Therefore, the electric power steering device including any one of the motors described above in the first to sixth embodiments and a controller 33 for controlling a current caused to flow through the windings of the motor, the controller 33 being for controlling the torque (assist torque) output from the motor, is provided. As a result, the smooth steering feel can be ensured. Further, the effects of improving the productivity are obtained.

Figure 23:
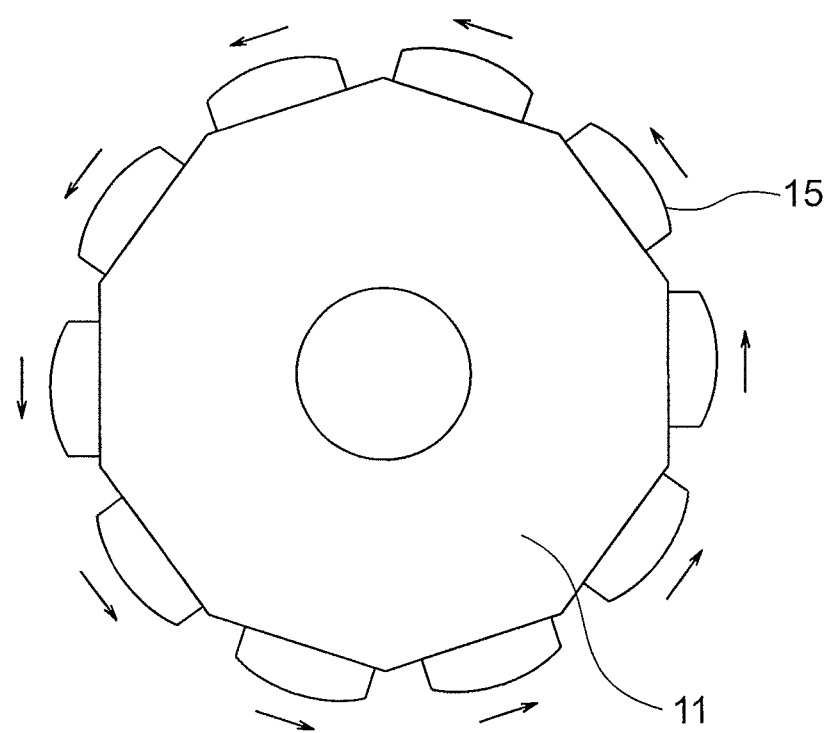
FIG. 23 is a view illustrating an example where projecting portions are not provided in the first configuration of the rotor of the permanent magnet type rotating electric machine according to the first embodiment of the present invention.
Figure 24:
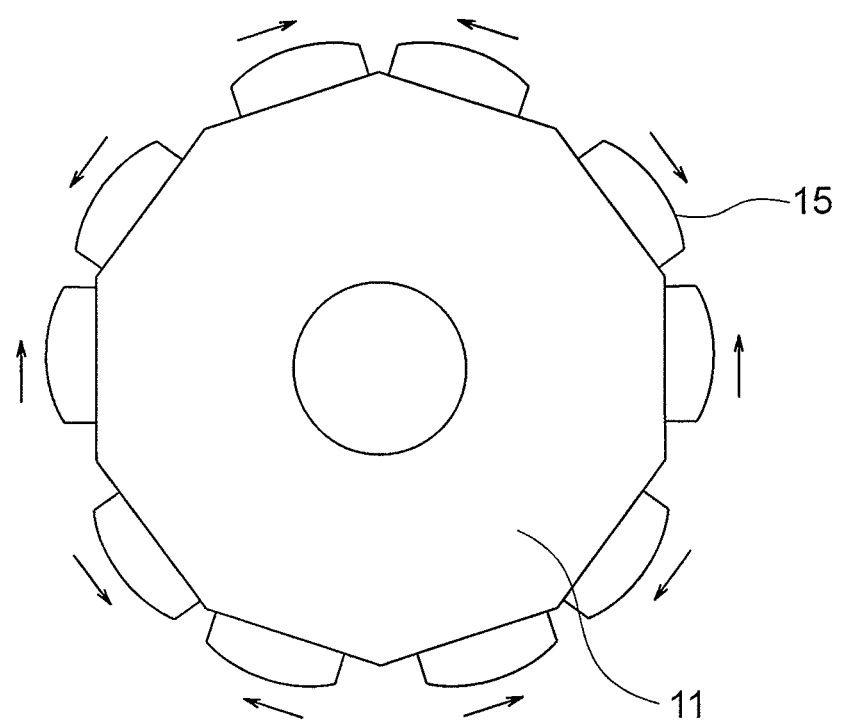
FIG. 24 is a view illustrating an example where projecting portions are not provided in the third configuration of the rotor of the permanent magnet type rotating electric machine according to the first embodiment of the present invention.
Figure 25:
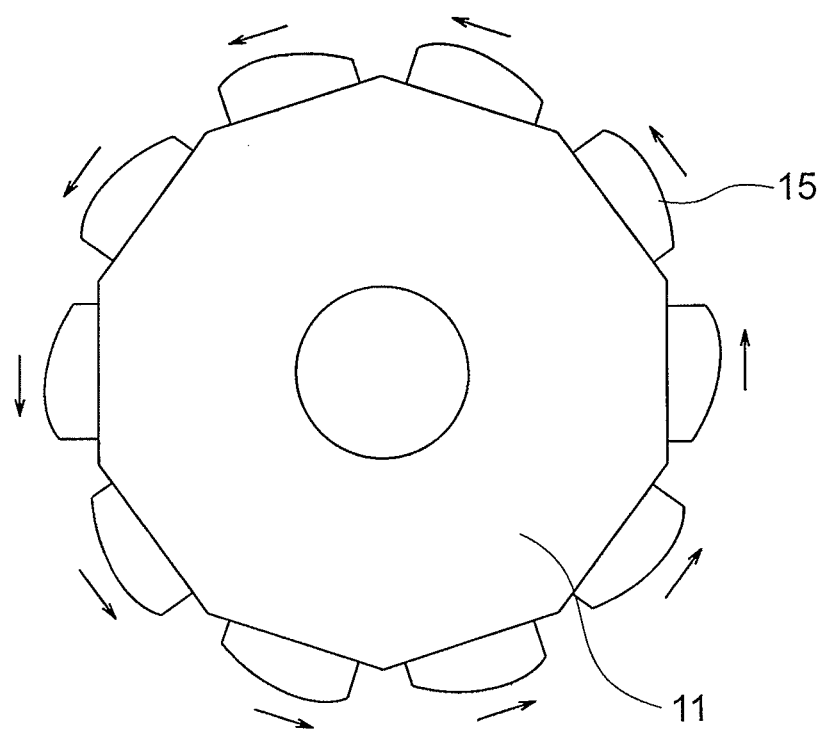
FIG. 25 is a view illustrating an example where projecting portions are not provided in the first configuration of the rotor of the permanent magnet type rotating electric machine according to the second embodiment of the present invention.
Figure 26:
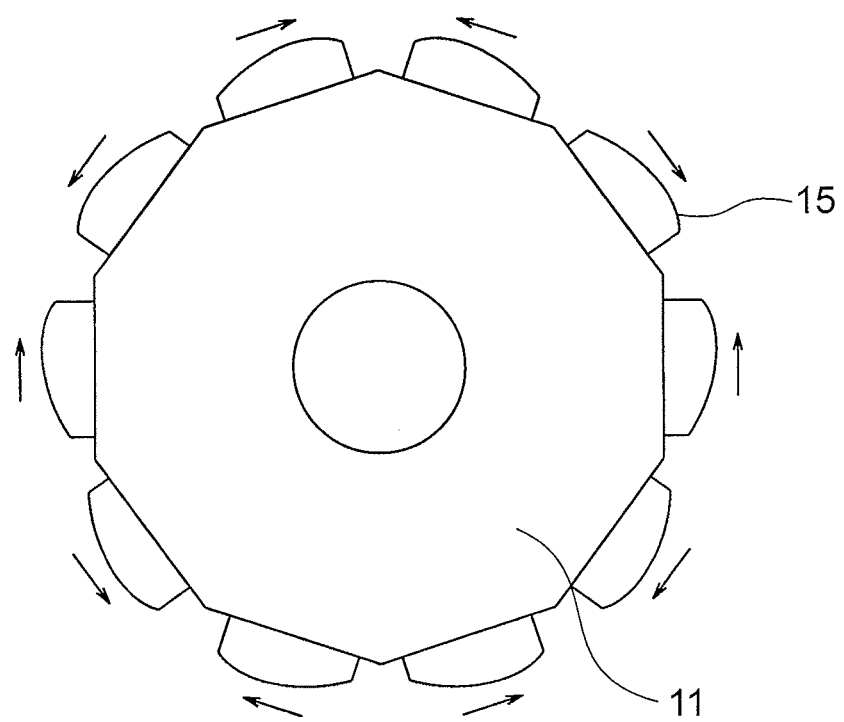
FIG. 26 is a view illustrating an example where projecting portions are not provided in the third configuration of the rotor of the permanent magnet type rotating electric machine according to the second embodiment of the present invention.

The example where the projecting portions 12 are provided to the rotor core 11 has been described in the aforementioned embodiments, however, the present invention is not realized only for the rotor core with the projecting portions 12. Even when the projecting portions 12 are not provided as illustrated in FIGS. 23, 24, 25, and 26, it is apparent that the same effects are demonstrated. FIG. 23 is a view illustrating an example where the projecting portions are not provided in the first configuration of the rotor of the permanent magnet type rotating electric machine according to the first embodiment of the present invention. FIG. 24 is a view illustrating an example where the projecting portions are not provided in the third configuration of the rotor of the permanent magnet type rotating electric machine according to the first embodiment of the present invention. FIG. 25 is a view illustrating an example where the projecting portions are not provided in the first configuration of the rotor of the permanent magnet type rotating electric machine according to the second embodiment of the present invention. Further, FIG. 26 is a view illustrating an example where the projecting portions are not provided in the third configuration of the rotor of the permanent magnet type rotating electric machine according to the second embodiment of the present invention.

The invention claimed is:

1. A permanent magnet type rotating electric machine, comprising:
    a rotor comprising
        a rotor core having a polygonally shaped periphery,
        a rotating shaft,
        a plurality of equiangularly arranged reference positions each of which is located in a center of a side of the polygonally shaped periphery at a same radial distance from a center of the rotating shaft, and
        a plurality of permanent magnets which form magnetic poles, which are arranged on the periphery of the rotor core, and which are shifted in circumferential directions according to a shift pattern which defines shifts of each of the plurality of permanent magnets which specifically target an N-th (N is an integer) order component of a cogging torque and predominantly reduce said N-th order component of the cogging torque; and
    a stator comprising a stator core, slots, and armature windings located in the slots,
    wherein, when a number of the magnetic poles is M (M is an integer) and a number of the slots is N, M permanent magnets are sequentially numbered from first to M-th in a circumferential direction and are shifted according to the shift pattern, and a positional shift amount from a corresponding one of the equiangularly arranged reference positions for an i-th (i=1, 2, . . . , M) permanent magnet is $h_i$ (i=1, 2, . . . , M) (including a sign), M unit vectors in total, each being in an angular direction of $2\pi N(i-1)/M$ (rad), are defined, and a sum of M vectors obtained by multiplying the unit vectors respectively by the positional shift amount $h_i$ is smaller than a maximum value of an absolute value of the positional shift amount $h_i$.

2. A permanent magnet type rotating electric machine according to claim 1, wherein the positional shifts of the plurality of permanent magnets in the circumferential directions from the equiangularly arranged reference positions, each being at the same radial distance from the center of the rotating shaft, are made in directions opposite to each other for the neighboring permanent magnets.

3. A permanent magnet type rotating electric machine according to claim 1, wherein a complex vector K, which is defined by $$K = \sum_{i=1}^{M} h_i e^{j\frac{2\pi N}{M}(i-1)} \qquad \text{[Equation 1]}$$

where e is a base of a natural logarithm, and j is an imaginary unit,
is smaller than the maximum value of the absolute value of the positional shift amount $h_i$ or is zero.

4. A permanent magnet type rotating electric machine according to claim 1, wherein:
    the rotor core includes the same number of projecting portions as that of the plurality of permanent magnets, the projecting portions being equiangularly provided on an outer periphery of the rotor core; and
    the plurality of permanent magnets are positioned so as to abut against the projecting portions, respectively.

5. A permanent magnet type rotating electric machine according to claim 1, wherein the rotor core is formed by laminating electromagnetic steel plates.

6. A permanent magnet type rotating electric machine according to claim 1, wherein:
    the number M of poles is 12n±2n (n is an integer equal to or larger than 1); and
    the number N of slots is 12n.

7. A permanent magnet type rotating electric machine according to claim 1, wherein:
    the number M of poles is 9n±n (n is an integer equal to or larger than 1); and
    the number N of slots is 9n.

8. An electric power steering device, comprising the permanent magnet type rotating electric machine according to claim 1 as a motor for adding an assist torque to a steering force of a steering wheel.

9. A permanent magnet type rotating electric machine according to claim 1, wherein the positional shifts of the plurality of permanent magnets in the circumferential directions from the equiangularly arranged reference positions, each being at the same radial distance from the center of the rotating shaft, are made in a same direction.

* * * * *